(12) United States Patent
Yu et al.

(10) Patent No.: US 12,096,275 B2
(45) Date of Patent: Sep. 17, 2024

(54) PADDING METHOD FOR AGGREGATED PPDU IN ENHANCEMENT OF IEEE 802.11AX

(71) Applicant: NEWRACOM, Inc., Lake Forest, CA (US)

(72) Inventors: Heejung Yu, Daejeon (KR); Yujin Noh, Irvine, CA (US); Jong-Ee Oh, Irvine, CA (US); Jaeyoung Ryu, Irvine, CA (US)

(73) Assignee: Newracom, Inc., Irvine, CA (US)

( * ) Notice: Subject to any disclaimer, the term of this patent is extended or adjusted under 35 U.S.C. 154(b) by 511 days.

(21) Appl. No.: 17/402,457

(22) Filed: Aug. 13, 2021

(65) Prior Publication Data

US 2022/0053371 A1 Feb. 17, 2022

Related U.S. Application Data

(60) Provisional application No. 63/123,984, filed on Dec. 10, 2020, provisional application No. 63/079,417, filed on Sep. 16, 2020, provisional application No. 63/065,867, filed on Aug. 14, 2020.

(51) Int. Cl.
*H04W 28/06* (2009.01)
*H04W 84/12* (2009.01)

(52) U.S. Cl.
CPC .......... *H04W 28/065* (2013.01); *H04W 84/12* (2013.01)

(58) Field of Classification Search
CPC .............................. H04W 28/065; H04W 84/12
See application file for complete search history.

(56) References Cited

U.S. PATENT DOCUMENTS

| 8,665,949 B1* | 3/2014 | Zhang | H04L 1/0625 |
| | | | 375/240.1 |
| 2014/0307653 A1* | 10/2014 | Liu | H04B 7/2612 |
| | | | 370/329 |
| 2016/0227437 A1* | 8/2016 | Blanksby | H04L 1/00 |
| 2018/0176901 A1* | 6/2018 | Huang | H04L 1/0008 |
| 2019/0090259 A1* | 3/2019 | Oteri | H04W 72/1268 |

(Continued)

OTHER PUBLICATIONS

IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.

(Continued)

*Primary Examiner* — Christine Ng
(74) *Attorney, Agent, or Firm* — Nutter McClennen & Fish LLP

(57) ABSTRACT

A method is described for a wireless device, which includes determining padding for a sub-physical layer (PHY) protocol data unit (sub-PPDU) in an aggregated PPDU (APPDU). The method includes generating the sub-PPDU that includes a preamble portion and a data portion, determining a longest sub-PPDU for the APPDU to be transmitted, determining an amount and type of padding for the sub-PPDU where the sub-PPDU in not the longest sub-PPDU in the APPDU, adding padding to the sub-PPDU to align the end of the sub-PPDU with the end of the longest sub-PPUD, and transmitting the sub-PPDU through a wireless medium on a transmission channel to a receiving device as part of the APPDU.

20 Claims, 32 Drawing Sheets

(56) References Cited

U.S. PATENT DOCUMENTS

| | | | | |
|---|---|---|---|---|
| 2019/0159127 A1* | 5/2019 | Son | .................... | H04W 52/0235 |
| 2020/0014576 A1* | 1/2020 | Cherian | ............ | H04W 72/0453 |
| 2020/0162187 A1* | 5/2020 | Zhang | ................... | H04L 1/0013 |
| 2020/0221545 A1* | 7/2020 | Stacey | ................. | H04W 84/12 |
| 2021/0266890 A1* | 8/2021 | Chu | ...................... | H04W 72/51 |
| 2021/0359885 A1* | 11/2021 | Shellhammer | ...... | H04L 27/2621 |
| 2021/0360472 A1* | 11/2021 | Cao | ..................... | H04L 27/2605 |
| 2021/0385115 A1* | 12/2021 | Cao | ......................... | H04L 69/22 |
| 2022/0278771 A1* | 9/2022 | Park | ..................... | H04L 1/0057 |

OTHER PUBLICATIONS

IEEE P802.11ax/D6.1, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, May 2020, 784 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks-Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

* cited by examiner

| MAXIMUM PHY RATE | PHY RATE ENHANCEMENT | BANDWIDTH/NUMBER OF SPATIAL STREAMS | OPERATING BANDS | |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHTSIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

| | TXVECTOR parameter NOMINAL_PACKET_PADDING (HE SU PPDU or HE ER SU PPDU) or NOMINAL_PACKET_PADDING[u] (HE MU PPDU) | | |
|---|---|---|---|
| 0 | 0 µs | 8 µs | 16 µs |
| 1 | 0 µs | 0 µs | 4 µs |
| 2 | 0 µs | 0 µs | 8 µs |
| 3 | 0 µs | 4 µs | 12 µs |
| 4 | 0 µs | 8 µs | 16 µs |

FIG. 14

| RU | DCM = 0 | | DCM = 1 | |
|---|---|---|---|---|
| | $N_{SD}$ | $N_{SD,short}$ | $N_{SD}$ | $N_{SD,short}$ |
| 26 | 24 | 6 | 12 | 2 |
| 52 | 48 | 12 | 24 | 6 |
| 78 | 72 | 18 | 36 | 8 |
| 106 | 102 | 24 | 51 | 12 |
| 132 | 126 | 30 | 63 | 14 |
| 242 | 234 | 60 | 117 | 30 |
| 484 | 468 | 120 | 234 | 60 |
| 726 | 702 | 180 | 351 | 90 |
| 996 | 980 | 240 | 490 | 120 |
| 996x2 | 1960 | 492 | 980 | 246 |
| 484+996 | 1448 | 360 | 724 | 180 |
| 484+996x2 | 2428 | 612 | 1214 | 306 |
| 484+996x3 | 3408 | 852 | 1704 | 426 |
| 996x3 | 2940 | 720 | 1470 | 360 |
| 996x4 | 3920 | 984 | 1960 | 492 |
| 242+484+996 | 1682 | 420 | 841 | 210 |

FIG. 17

| AID12 subfield | Description |
|---|---|
| 0 | User Info field allocates one or more contiguous RA-RUs for associated STAs |
| 1–2007 | User Info field is addressed to an associated STA whose AID is equal to the value in the AID12 subfield |
| 2008–2044 | Reserved |
| 2045 | User Info field allocates one or more contiguous RA-RUs for unassociated STAs |
| 2046 | Unallocated RU |
| 2047–4094 | Reserved |
| 4095 | Start of Padding field |

FIG. 28

PADDING METHOD FOR AGGREGATED PPDU IN ENHANCEMENT OF IEEE 802.11AX

CROSS-REFERENCE TO RELATED APPLICATION

This application claims the benefit of U.S. Provisional Application No. 63/123,984 filed Dec. 10, 2020, U.S. Provisional Application No. 63/079,417 filed Sep. 16, 2020, and U.S. Provisional Application No. 63/065,867 filed Aug. 14, 2020, each titled, "PADDING METHOD FOR AGGREGATED PPDU IN ENHANCEMENT OF IEEE 802.11AX," which are hereby incorporated by reference.

TECHNICAL FIELD

The present disclosure generally relates to wireless communications, and more specifically, relates to an overlapping basic service set (BSS) status indication for an access point (AP) cooperative transmission.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIG. 14 is a diagram of a table for the Nominal $T_{PE}$ value in IEEE 802.11ax.

FIG. 17 illustrates that the $N_{SD,short}$ values depending on RU-size and DCM in IEEE 802.11be.

FIG. 28 is a diagram of one embodiment of a table of the AID12 subfield encoding in IEEE 802.11ax.

DETAILED DESCRIPTION

Figure 1:
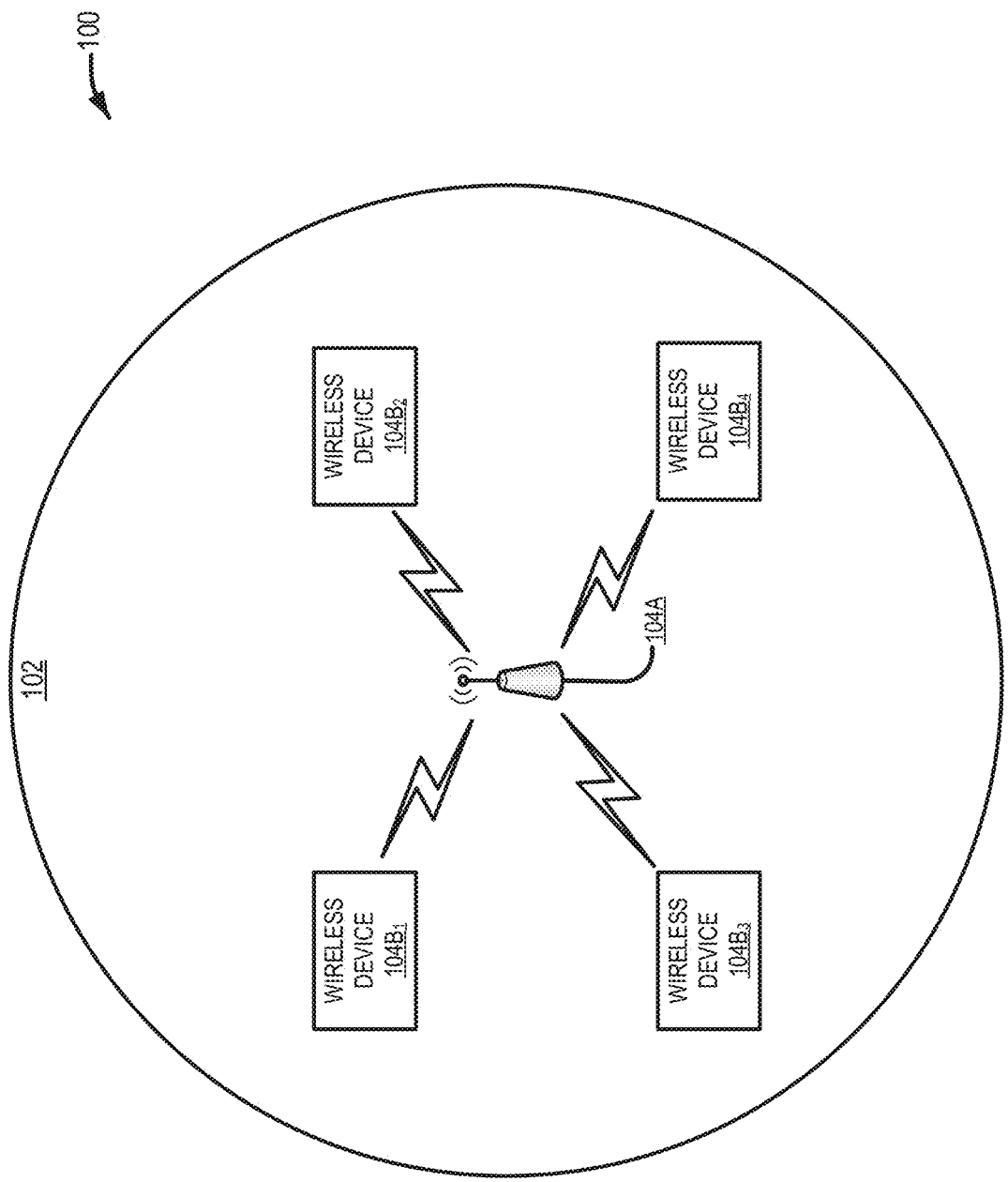
FIG. 1 illustrates an example wireless local area network (WLAN) with a basic service set (BSS) that includes a plurality of wireless devices, in accordance with some embodiments of the present disclosure.

The present disclosure generally relates to a process for padding for aggregated physical layer (PHY) Protocol Data Units (PPDU) in an enhancement of the IEEE 802.11ax standard. The embodiments provide an enhancement of IEEE 802.11ax, i.e., IEEE 802.11be, where an aggregated PPDU (APPDU) format is provided. In the APPDU, several sub-PPUDs are simultaneously transmitted through the different subchannels (e.g., a single or multiple 20 MHz subchannels). For efficient operation, packet decoding, and acknowledgement (ACK) feedback by multiple recipients, an alignment of the end of a packet, i.e., a packet end, for the multiple sub-PPDUs in an APPDU is required. Therefore, in the embodiments, several padding methods are provided to align the packet end of all sub-PPDUs.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
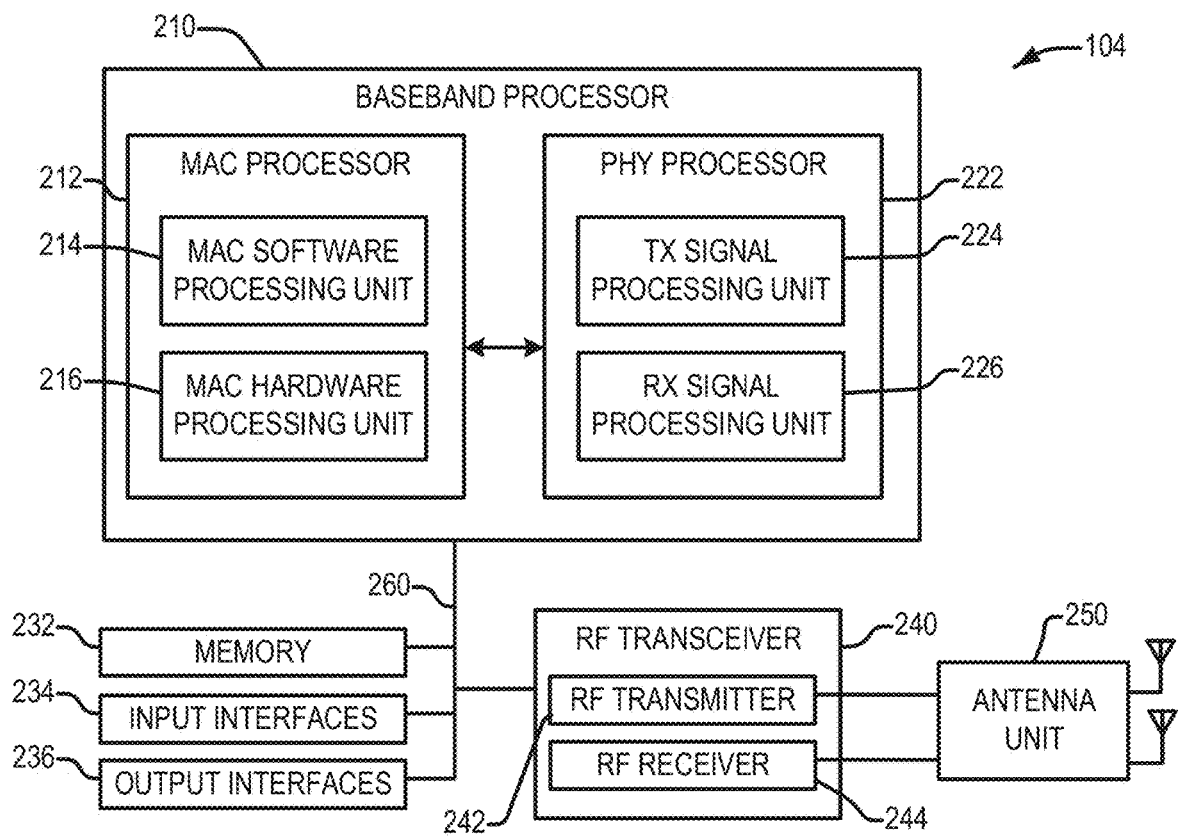
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi- User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
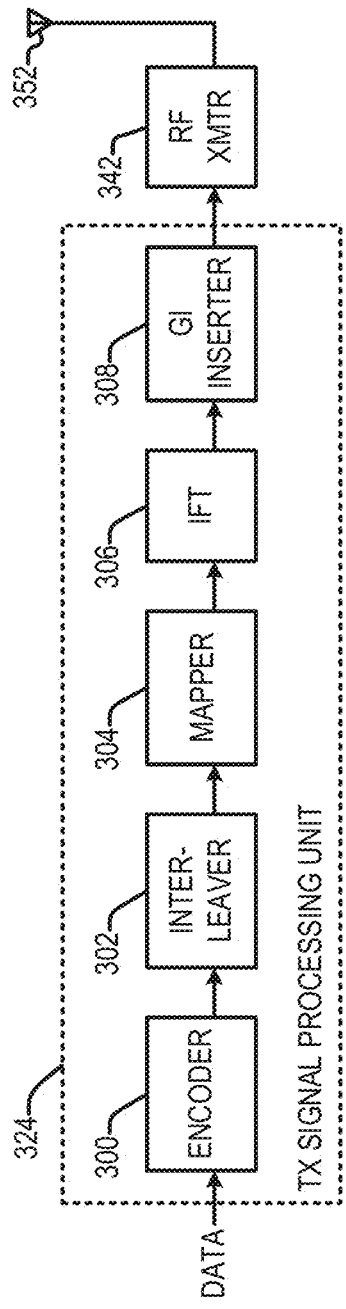
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
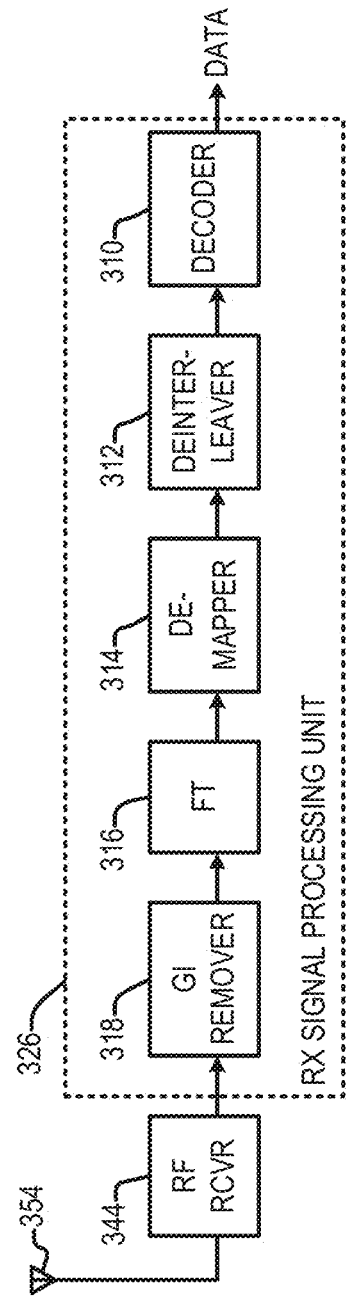
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
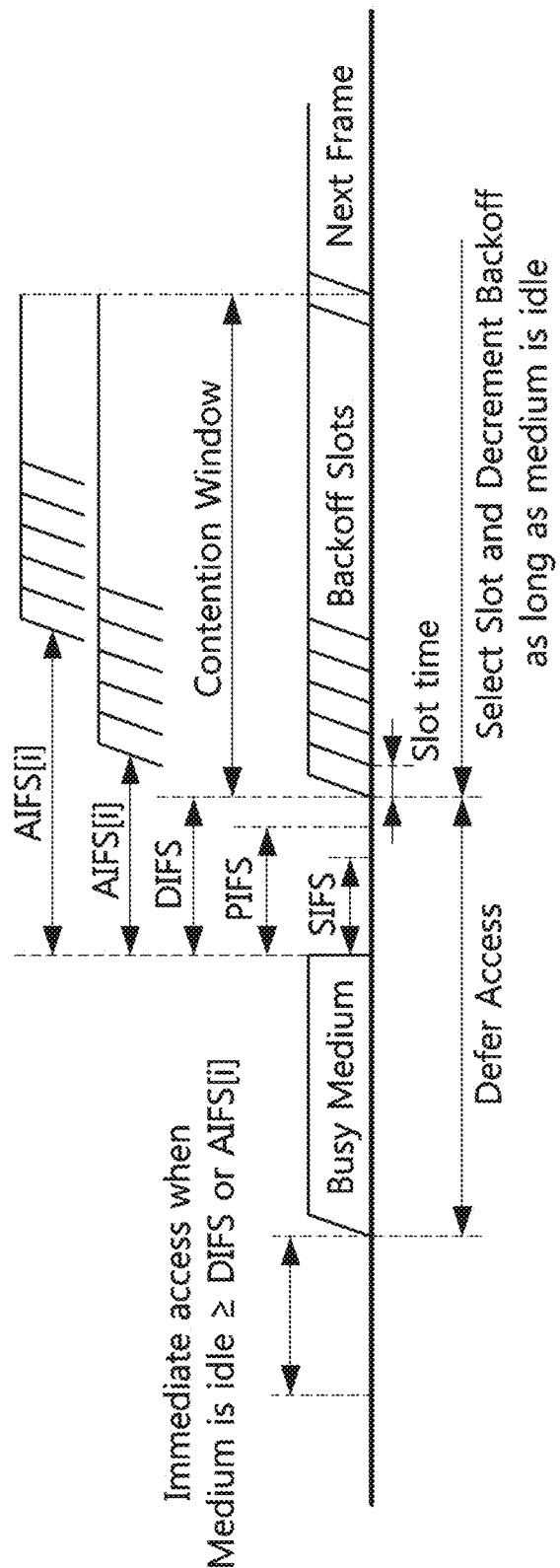
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
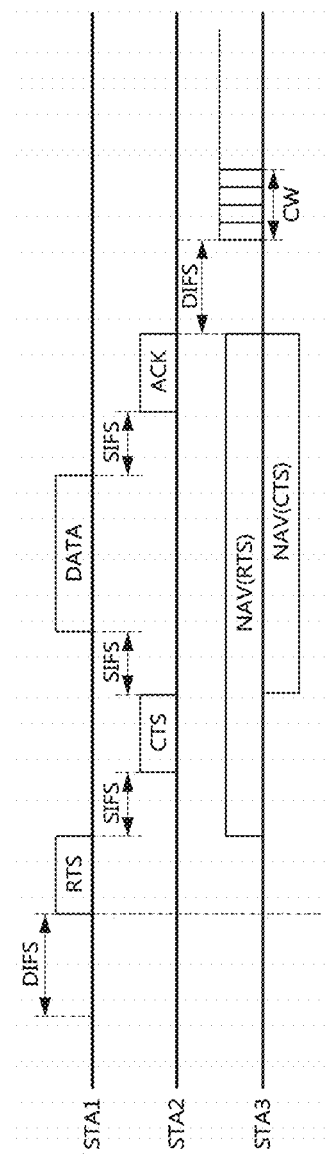
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARD)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

The embodiments provided herein have been described with reference to a wireless LAN system; however, it should be understood that these embodiments are also applicable to other network environments, such as cellular telecommunication networks, wired networks, and similar wireless communication networks.

The embodiments can include an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 8:
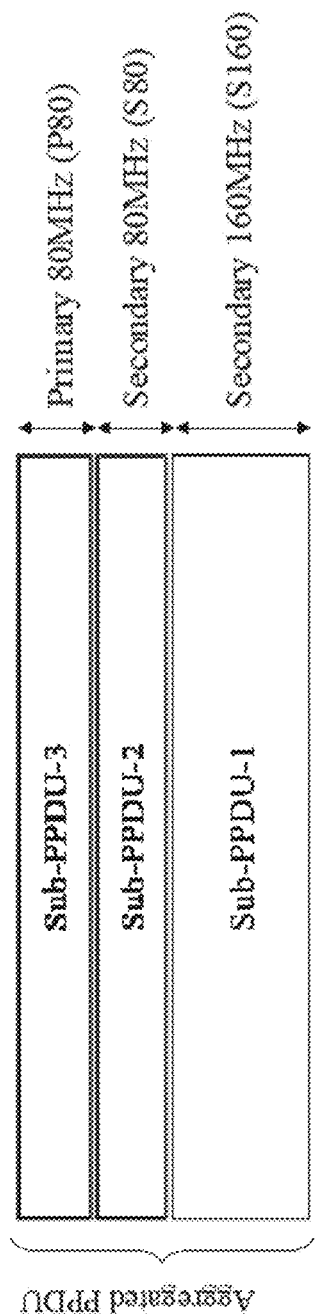
FIG. 8 is a diagram of one embodiment of an aggregated physical layer (PHY) protocol data unit (APPDU).
Figure 9:
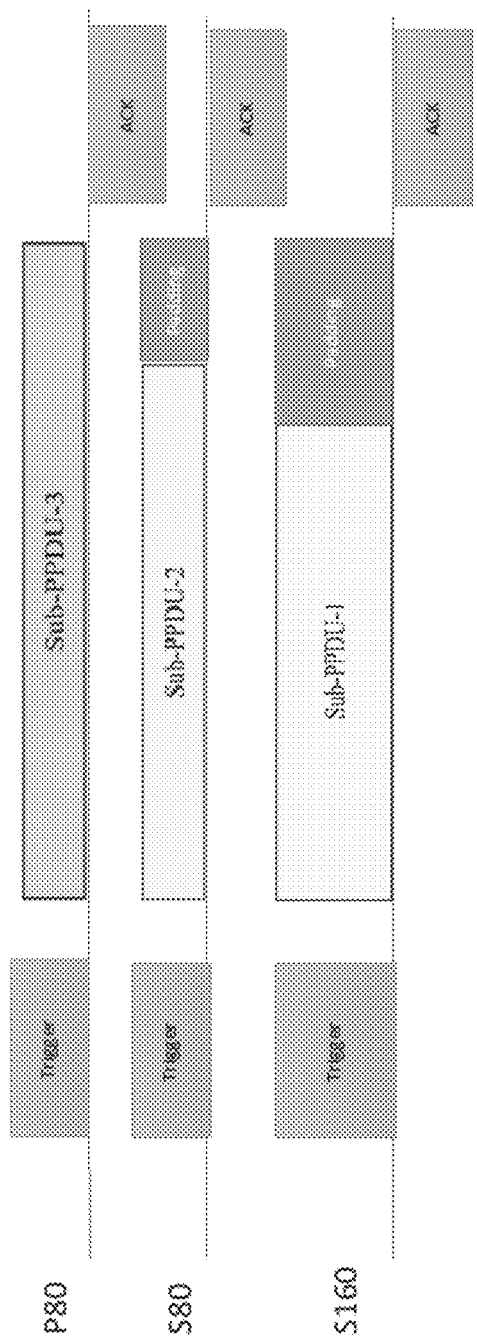
FIG. 9 is a diagram of one example embodiment of an APPDU transmission.

As one way of managing wideband, e.g., 320 MHz bandwidth, in IEEE 802.11be, an APPDU can be used. In a wideband APPDU, multiple sub-PPDUs can occupy the different subchannels as shown in FIG. 8. In an APPDU, multiple sub-PPDUs can be transmitted or received by different source or destination stations (STAs), respectively. Thus, each sub-PPDU can be transmitted by a different STA or each sub-PPDU can be received by a different STA, and any combination thereof. In an APPDU, each sub-PPDU occupies non-overlapping frequency segments. Each sub-PPDU is orthogonal in frequency domain symbol-by-symbol. Moreover, each sub-PPDU can have the same PPDU format or different PPDU format, i.e., each sub-PPDUs can follow a different WI-FI (IEEE 802.11) amendment (e.g., 802.11ac/ax/be). For example, sub-PPDU-1 in the illustrated example can be an IEEE 802.11ax packet, sub-PPDU-2 can be an IEEE 802.11be packet, and sub-PPDU-3 can be a post-IEEE 802.11be packet, i.e., the next enhancement of IEEE 802.11be. In FIG. 8, three sub-PPUDs are illustrated with sub-PPDU-3 in primary 80 MHz, sub-PPDU-2 in secondary 80 MHz, and sub-PPDU-1 in secondary 160 MHz channels as illustrated. The primary and secondary subchannels can have a single or multiple 20 MHz channel bandwidth. The receivers can decode the corresponding sub-PPDUs and send back an ACK frame to the source simultaneously. To this end, consistent tone spacing in different WI-FI (IEEE 802.11) amendments in multiple sub-PPDU is required. Proper Preamble design and symbol alignment between sub-PPDUs are also needed. Additionally, the embodiments can guarantee the orthogonality of the transmissions from different WI-FI (802.11) amendments. Alignment of the packet end for the APPDUE is desirable. In the embodiments, a process and system for alignment of the packet end between sub-PPUDs is provided. FIG. 9 shows an example of APPDU transmission. A trigger frame is sent to initiate and notify receiver STAs of the APPDU transmission. Though the trigger frame is sent through all subchannels in the figure, the trigger frame can be transmitted only in the primary subchannel. In the APPDU, the sub-PPDU-1 and the sub-PPDU-2 include padding in the last one or more OFDM symbols because their transmission time is shorter than that of sub-PPDU-3. The padding shown in FIG. 9 is added to align the APPDU packet end across the three sub-PPDUs. This padding is different from the padding in IEEE 802.11ax (pre-FEC, post-FEC and packet extension (PE)) that is used to fill the last OFDM symbol in the respective sub-PPDU and secure the decoding time. The details of the APPDU padding are further described herein below. After receiving the APPDU, the destination STAs send back ACK frames simultaneously. If ACK frames cannot be sent simultaneously, the ACK frames can be sent successively.

In one embodiment, an extension or modification of the padding method in IEEE 802.11ax is utilized. The padding in IEEE 802.11ax consists of pre-FEC padding, post-FEC padding, and PE. The pre-FEC padding and post-FEC padding are used to fill the last OFDM symbol, and the PE is added to secure more receiver processing time depending on the receiver's capability to send back the corresponding ACK frame within SIFS time. A pre-FEC padding process including both pre-FEC MAC and pre-FEC PHY padding is applied before conducting FEC coding, and a post-FEC PHY padding process is appended to the FEC encoded bits.

Figure 10:
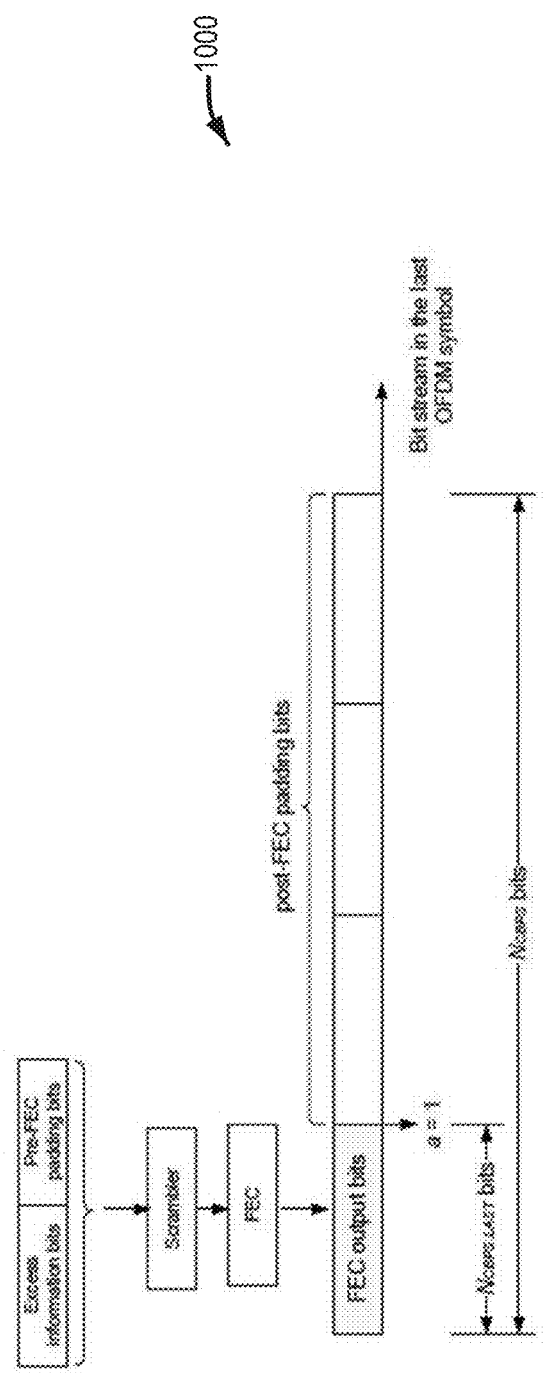
FIG. 10 is an example diagram of padding in a high efficiency (HE) PPDUE.

Four pre-FEC padding boundaries partition the last one (in the case of non-space time block coding (STBC)) or two (in the case of STBC) OFDM symbols of a high efficiency (HE) PPDU into four symbol segments. The pre-FEC padding may pad toward one of the four possible boundaries. The four pre-FEC padding boundaries are represented by a pre-FEC padding factor parameter, which is denoted by 'a'. FIG. 10 is an example diagram of padding in an HE PPDUE. Specifically, the diagram illustrates an HE PPDU padding process in the last OFDM symbol (non-STBC) if 'a'=1), which illustrates the four possible symbol segments in the last OFDM symbol of a non-STBC case, and the general padding process assuming the desired pre-FEC padding boundary, represented by the pre-FEC padding factor, is 1. In the case of STBC, the FEC output bits and post-FEC padding bits are modulated into the last two OFDM symbols by STBC encoding, each with the same pre-FEC padding boundary.

Figure 11:
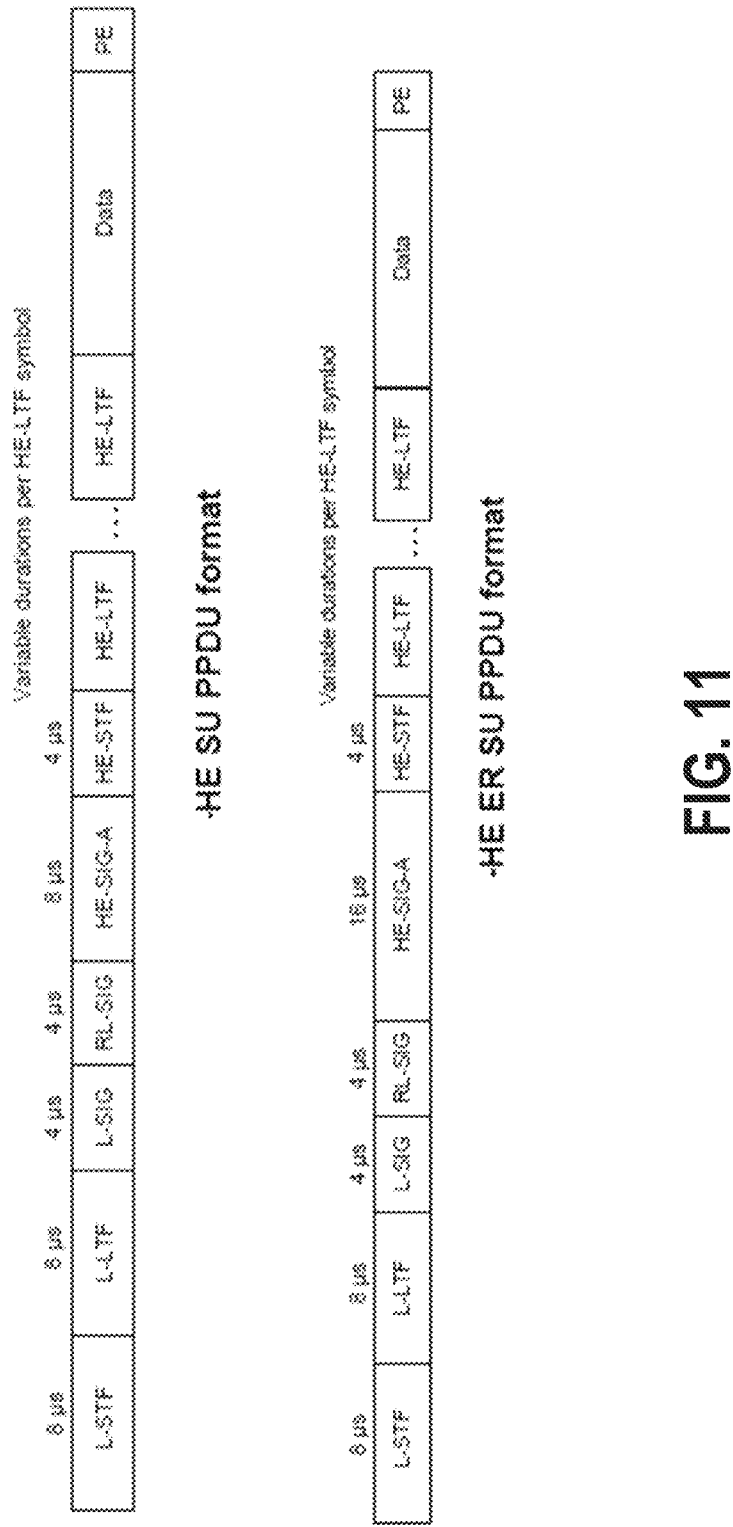
FIG. 11 is a diagram of an HE single user (SU) PPDU and an HE extended range (ER) SU PPDU format in IEEE 802.11ax.

FIG. 11 is a diagram of an HE single user (SU) PPDU and an HE extended range (ER) SU PPDU format in IEEE 802.11ax. In an HE SU PPDU and HE ER SU PPDU transmission shown in FIG. 11, the transmitter first computes the number of bits left in the last OFDM symbol(s) based on Eq. (1).

$$N_{Excess} = \mathrm{mod}(8 \cdot \mathrm{APEP\_LENGTH} + N_{Tail} + N_{service}, m_{STBC} \cdot N_{DBPS}) \quad (1)$$

where $n_{STBC}$ is 2 if STBC is used, 1 otherwise,
APEP_LENGTH is TXVECTOR parameter APEP_LENGTH,
$N_{Tail}$ is the number of tail bits per encoder,
$N_{service}$ is the number of bits in the SERVICE field,
$N_{DBPS}$ is the number of data bits per symbol.

Figure 12:
FIG. 12 is a diagram of a table of $N_{SD,short}$ values depending on resource unit (RU)-size in IEEE 802.11ax.

Based on N Excess, compute the initial number of symbol segments in the last OFDM symbol(s), initial pre-FEC padding factor value or $a_{init}$, as shown in Eq. (2).

$$a_{init} = \begin{cases} 4, & \text{if } N_{Excess} = 0 \\ \min\left(\left\lceil \dfrac{N_{Excess}}{m_{STBC} \cdot N_{DBPS,short}} \right\rceil, 4\right), & \text{otherwise} \end{cases} \quad (2)$$

where $N_{DBPS,short} = N_{CBPS,short} \cdot R$, in which R is the coding rate, and $N_{CBPS,short} = N_{SD,short} \cdot N_{SS} \cdot N_{BPSCS}$, in which $N_{BPSCS}$ is the number of coded bits per sub-carrier per spatial stream, $N_{SS}$ is the number of spatial streams, and $N_{SD,short}$ is given by table 1200 in FIG. 12. FIG. 12 is a diagram of a table of $N_{SD,short}$ values depending on RU-size in IEEE 802.11ax.

Given the $a_{init}$ values, the initial number of data bits per symbol and the initial number of coded bits per symbol in the last OFDM symbol(s) are defined in Eq. (3).

$$N_{DBPS,last,init} = \begin{cases} a_{init} N_{DBPS,short}, & \text{if } a_{init} < 4 \\ N_{DBPS}, & \text{if } a_{init} = 4 \end{cases} \quad (3)$$

$$N_{CBPS,last,init} = \begin{cases} a_{init} N_{CBPS,short}, & \text{if } a_{init} < 4 \\ N_{CBPS}, & \text{if } a_{init} = 4 \end{cases}$$

For an HE SU PPDU and HE ER SU PPDU, the number of pre-FEC pad bits is calculated using Eq. (4).

$$N_{PAD,Pre-FEC} = (N_{SYM,init} - m_{STBC}) N_{DBPS} + m_{STBC} \\ N_{DBPS,last,init} - 8 \cdot \mathrm{APEP\_LENGTH} - N_{Tail} - N_{service} \quad (4)$$

where $N_{SYM,init}$ is the initial number of data OFDM symbols with BCC or LDPC encoding in an HE SU PPDU or HE ER SU PPDU as defined by Eq. (5).

$$N_{SYM,init} = M_{STBC} \cdot \left\lceil \dfrac{8 \cdot \mathrm{APEP\_LENGTH} + N_{Tail} + N_{service}}{m_{STBC} N_{DBPS}} \right\rceil \quad (5)$$

Among the pre-FEC padding bits, the MAC delivers a PSDU that fills the available octets in the Data field of the HE PPDU toward the desired initial pre-FEC padding boundary, represented by $a_{init}$ value, in the last OFDM symbol(s). The number of pre-FEC pad bits added by MAC can be a multiple of 8. The PHY then determines the number of remaining pad bits to add and appends them to the PSDU. The number of pre-FEC pad bits added by PHY can be 0 to 7. The procedure is defined in Eq. (6).

$$N_{PAD,Pre-FEC,MAC} = \left\lfloor \frac{N_{PAD,Pre-FEC}}{8} \right\rfloor \cdot 8 \quad (6)$$

$$N_{PAD,Pre-FEC,PHY} = N_{PAD,Pre-FEC} \bmod 8$$

For post-FEC padding, the process determines $N_{CBPS,last}$ with $N_{CBPS,last,init}$ depending on the FEC scheme such as BCC and LDPC. For a BCC case, $N_{SYM}=N_{SYM,init}$, $a=a_{init}$, $N_{DBPS,last}=N_{DBPS,last,init}$, and $N_{CBps,last}=N_{CBPS,last,init}$. The LDPC case is further described in the IEEE 802.11ax standard.

The number of post-FEC padding bits in each of the last $m_{STBC}$ symbol(s) is computed by Eq. (7):

$$N_{PAD,Post-FEC} = N_{CBPS} - N_{CBPS,last} \quad (7)$$

The last $m_{STBC}$ symbols can consist of $N_{CBPS,last}$ bits from the FEC output followed by $N_{PAD,Post-FEC}$ post-FEC padding bits.

For an HE MU PPDU, all the users (e.g., STAs) use a common pre-FEC padding factor value and a common $N_{SYM}$ value. The padding process is described as follows. First compute initial pre-FEC padding factor value, $a_{init,u}$, for each user u using Eq. (2), and the initial number of OFDM symbols, $N_{SYM,init,u}$, for each user u using Eq. (5). Among all the users, derive the user index with the longest encoded packet duration, as in Eq. (8).

$$u_{max} = \arg\max_{u=0}^{N_{user,total}-1} \left( N_{SYM,init,u} - m_{STBC} + \frac{m_{STBC} a_{init,u}}{4} \right) \quad (8)$$

where $\arg\max f(x) := \{x | x \in [0, N_{user,total}-1] \; \forall y \in [0, N_{user,total}-1]; f(y) \le f(x)\}$ $m_{STBC}$ is the common STBC setting among all the users. If STBC is operated, it is 1 otherwise 2.

Then the common $a_{init}$ and $N_{SYM,init}$ values among all the users are derived by Eq. (9).

$N_{SYM,init} = N_{SYM,init,u_{max}}$ $a_{init} = a_{init,u_{max}} \quad (9)$

The process then calculates each user's initial number of coded bits in its last symbol as in Eq. (10).

$$N_{DBPS,last,init,u} = \begin{cases} a_{init} N_{DBPS,short,u}, & \text{if } a_{init} < 4 \\ N_{DBPS,u}, & \text{if } a_{init} = 4 \end{cases} \quad (10)$$

$$N_{CBPS,last,init,u} = \begin{cases} a_{init} N_{CBPS,short,u}, & \text{if } a_{init} < 4 \\ N_{CBPS,u}, & \text{if } a_{init} = 4 \end{cases}$$

For each user with LDPC encoding, the number of pre-FEC padding bits is computed as in Eq. (11).

$$N_{PAD,Pre-FEC,u} = (N_{SYM,init} - m_{STBC}) N_{DBPS,u} + m_{STBC} N_{DBPS,last,init,u} - 8 \cdot APEP\_LENGTH_u - N_{service} \quad (11)$$

Update the common pre-FEC padding factor and $N_{SYM}$ values for all users by Eq. (12).

$$\begin{cases} N_{SYM} = N_{SYM,init} + m_{STBC} \text{ and } a = 1, & \text{if } a_{init} = 4 \\ N_{SYM} = N_{SYM,init} \text{ and } a = a_{init} + 1, & \text{otherwise} \end{cases} \quad (12)$$

If all the users in the MU PPUD are BCC encoded, then the LDPC extra symbol segment field is set to 0, and the common pre-FEC padding factor and $N_{SYM}$ values for all users are updated by Eq. (13).

$a = a_{init}, N_{SYM} = N_{SYM,init} \quad (13)$

For the users with LDPC encoding, $N_{DBPS,last,u} = N_{DBPS,last,init,u}$.

For the users with BCC encoding, update the $N_{DBPS}$ of the last symbol as Eq. (14).

$$N_{DBPS,last,u} = \begin{cases} a \cdot N_{DBPS,short,u}, & \text{if } a < 4 \\ N_{DBPS,u}, & \text{if } a = 4 \end{cases} \quad (14)$$

For each user with either LDPC or BCC encoding, update the $N_{CBPS}$ of the last symbol as Eq. (15).

$$N_{CBPS,last,u} = \begin{cases} a \cdot N_{CBPS,short,u}, & \text{if } a < 4 \\ N_{CBPS,u}, & \text{if } a = 4 \end{cases} \quad (15)$$

For the users with BCC encoding, the number of pre-FEC padding bits is shown in Eq. (16).

$$N_{PAD,Pre-FEC,u} = (N_{SYM} - m_{STBC}) N_{DBPS,u} + m_{STBC} N_{DBPS,last,u} - 8 \cdot APEP\_LENGTH_u - N_{Tail} - N_{service} \quad (16)$$

For each user with either LDPC or BCC encoding, the number of post-FEC padding bits in each of the last $m_{STBC}$ symbol(s) is computed as in Eq. (17).

$N_{PAD,Post-FEC,u} = N_{CBPS,u} - N_{CBPS,last,u} \quad (17)$

Among the pre-FEC padding bits, the MAC delivers a PSDU that fills the available octets in the Data field of the HE PPDU, toward the desired initial pre-FEC padding boundary represented by $a_{init}$ for users encoded by LDPC and the pre-FEC padding boundary represented for users encoded by BCC, in the last OFDM symbol(s). The PHY then determines the number of pad bits to add and appends them to the PSDU. The number of pre-FEC pad bits added by PHY can be 0 to 7. The procedure is defined in Eqs. (18) and (19).

$$N_{PAD,Pre-FEC,MAC,u} = \left\lfloor \frac{N_{PAD,Pre-FEC,u}}{8} \right\rfloor \quad (18)$$

$$N_{PAD,Pre-FEC,PHY,u} = N_{PAD,Pre-FEC,u} \bmod 8 \quad (19)$$

Figure 13:
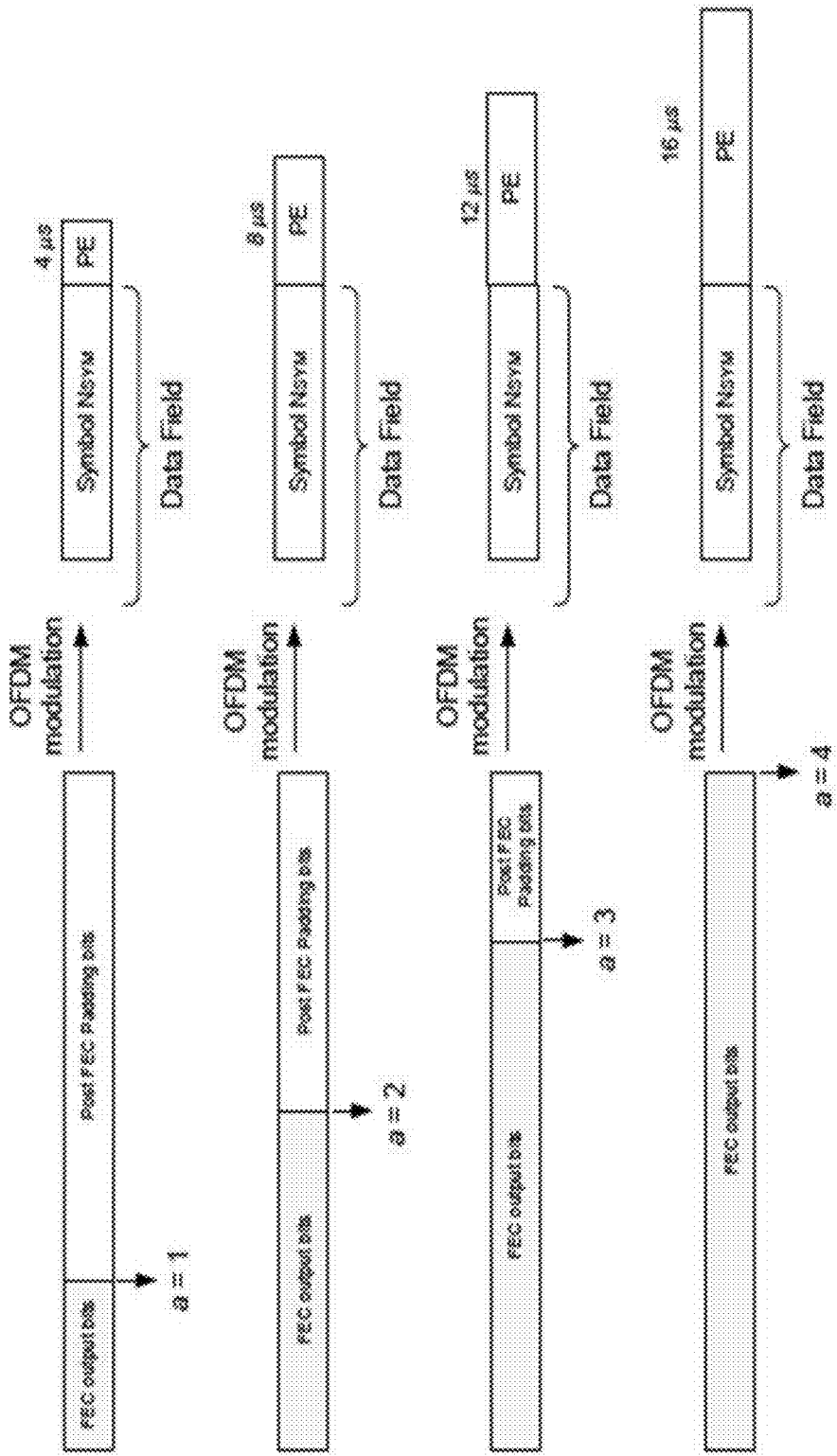
FIG. 13 is a diagram that shows examples of the PE field duration in an HE SU PPDU or HE ER SU PPDU for a=1-4 without midambles.

A PE field of duration 4 μs, 8 μs, 12 μs, or 16 μs may be present in an HE PPDU. The PE field provides additional receive processing time at the end of the HE PPDU. The PE field, if present, shall be transmitted with the same average power as the Data field and shall not cause significant power leakage outside of the spectrum used by the Data field. The duration of the PE field, $T_{PE}$, can take values of 0, 4, 8, 12 or 16 μs. $T_{PE}$ for an HE SU, HE ER SU or HE multi-user (MU) PPDU and is not less than $T_{PE,nominal}$. $T_{PE}$ for an HE SU, HE ER SU or HE MU PPDU can be equal to $T_{PE,nominal}$ to minimize the packet extension overhead. FIG. 13 shows examples of the PE field duration in an HE SU PPDU or HE ER SU PPDU for a=1-4 without midambles. For example, if TXVECTOR parameter NOMINAL_PACKET_PADDING is 16 μs and $T_{PE}=T_{PE,nominal}$. FIG. 14 is a diagram of a table for the Nominal $T_{PE}$ value in IEEE 802.11ax.

For the longest sub-PPDU (for example, sub-PPDU 3 in FIG. 8) in an APPDU, the described padding scheme in IEEE 802.11ax can be applied. Moreover, if the last OFDM symbols which include the excess info bits of the other sub-PPDUs are located in the same OFDM symbol time as the last OFDM symbol time of the longest sub-PPDU, i.e., the number of OFDM symbols for all sub-PPDUs before pre- and post-FEC padding are same, the IEEE 802.11ax padding scheme can be applied to all sub-PPDUs. However, any of the shorter sub-PPDUs (e.g., sub-PPDU-1 and sub-PPDU-2 in FIG. 8) have fewer OFDM symbols than the longest sub-PPDU, any one or more of a set of extensions of the IEEE 802.11ax padding scheme can be utilized.

Figure 15:
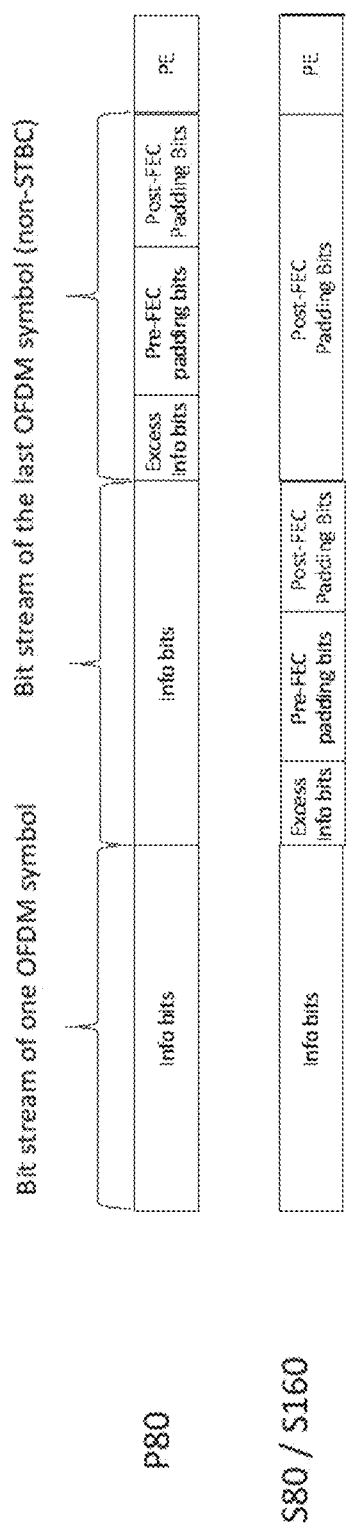
FIG. 15 shows one embodiment of an example of APPDU padding with the extended post-FEC padding.
Figure 16:
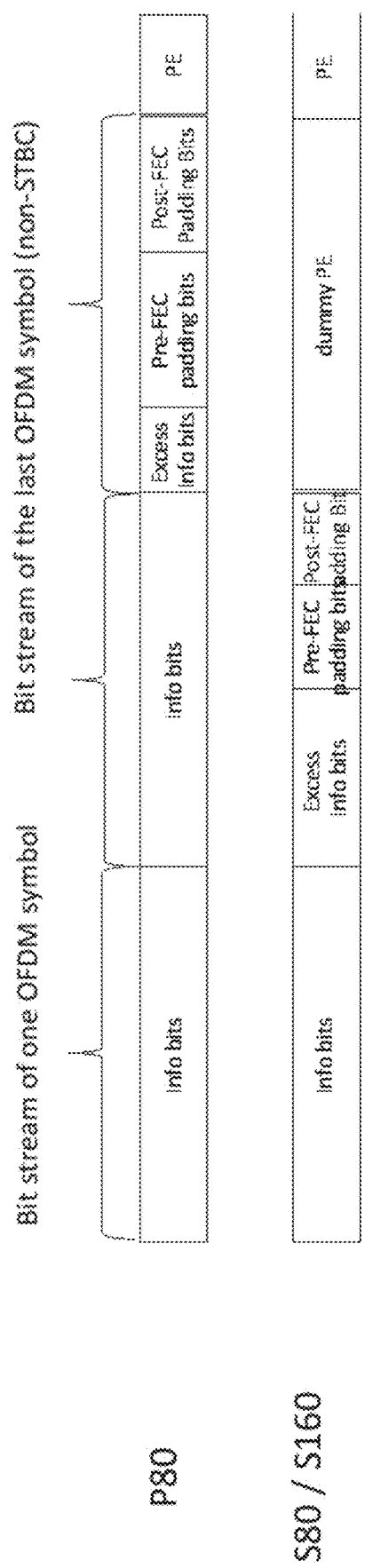
FIG. 16 is an example of APPDU padding with the extend PE. In this embodiment, one or more additional OFDM symbol are added and padded with a dummy PE.

In one embodiment, the padding scheme is to extend the post-FEC padding and the other padding scheme is to extend the PE for additional OFDM symbols. FIG. 15 shows one embodiment of an example of APPDU padding with the extended post-FEC padding. In this embodiment, one or more OFDM symbols is appended to the transmission to match the number of OFDM symbols with the longest sub-PPDU. In another embodiment, FIG. 16 is an example of APPDU padding with the extend PE. In this embodiment, one or more additional OFDM symbol are added and padded with a dummy PE. Therefore, either of these two approaches can be used to align the packet end of all sub-PPDUs in an APPDU. In the case where the dummy PE is utilized, the dummy PE is the length of one or multiple OFDM symbols as needed for alignment. For example, a dummy PE could be the same length of one or more data OFDM symbols. For example, corresponding GI could be used in a SIG field where the GI could be 0.8, 1.6 or 3.2 microseconds (us). Assuming one OFDM symbol duration with 13.6, 14.4 or 16 us, the dummy PE could be a multiple of the unit of 13.6, 14.4 or 16 us.

In IEEE 802.11 there is support for different resource unit (RU) sizes, which was not defined in IEEE 802.11ax. Therefore, the embodiments define the $N_{SD}$, and $N_{SD,short}$ of the IEEE 802.11be standard for different RU with and without dual carrier modulation (DCM) as shown in the table of FIG. 17. $N_{SD}$ denotes the number of data subcarriers in a regular OFDM symbol and $N_{SD,short}$ denotes the number of data subcarriers for the shortened OFDM symbol. $N_{SD,short}$ is used to determine the number of data bits to fill e.g., ¼, ½, and ¾ data subcarriers roughly in reference to eq (2). The values in the table of FIG. 17 are applicable to all EHT PPDU types. The table of FIG. 17 illustrates that the $N_{SD,short}$ values depending on RU-size and DCM in IEEE 802.11be.

In a further embodiment, another approach to APPDU padding can utilize an RU control, i.e., bandwidth control. For sub-PPDU transmission, this embodiment uses the largest RU size to make the length of each sub-PPUD to be as similar as possible to the length of the longest sub-PPDU. For example, with an APPDU consisting of two sub-PPDUs, where the two sub-PPDUs are using 80 MHz bandwidth for each. The longer sub-PPUD has $N_{SYM,1}$ OFDM symbols with 996-RU and the shorter sub-PPUD has $N_{SYM,2}$ OFDM symbols for 996-RU. This embodiment can determine the RU and $N_{SD}$ for the shorter sub-PPUD as follows:

If $\{N_{SYM,2} > N_{SYM,1}*(702/980)\}$, RU size for the shorter sub-PPDU=996 tones, $N_{SD}$=980 else if $\{N_{SYM,2} > N_{SYM,1}*(468/980)\}$, RU size for the shorter sub-PPDU=726 tones, $N_{SD}$=702 else if $\{N_{SYM,2} > N_{SYM,1}*(243/980)\}$, RU size for the shorter sub-PPDU=484 tones, $N_{SD}$=486 else if $\{N_{SYM,2} > N_{SYM,1}*(126/980)\}$, RU size for the shorter sub-PPDU=242 tones, $N_{SD}$=243 else if $\{N_{SYM,2} > N_{SYM,1}*(102 1980)\}$, RU size for the shorter sub-PPDU=132 tones, $N_{SD}$=126 else if $\{N_{SYM,2} > N_{SYM,1}*(72/980)\}$, RU size for the shorter sub-PPDU=106 tones, $N_{SD}$=102 else if $\{N_{SYM,2} > N_{SYM,1}*(48/980)\}$, RU size for the shorter sub-PPDU=78 tones, $N_{SD}$=72 else if $\{N_{SYM,2} > N_{SYM,1}*(24/980)\}$, RU size for the shorter sub-PPDU=52 tones, $N_{SD}$=48 else, RU size for the shorter sub-PPDU=26 tones, $N_{SD}$=24

Figure 18:
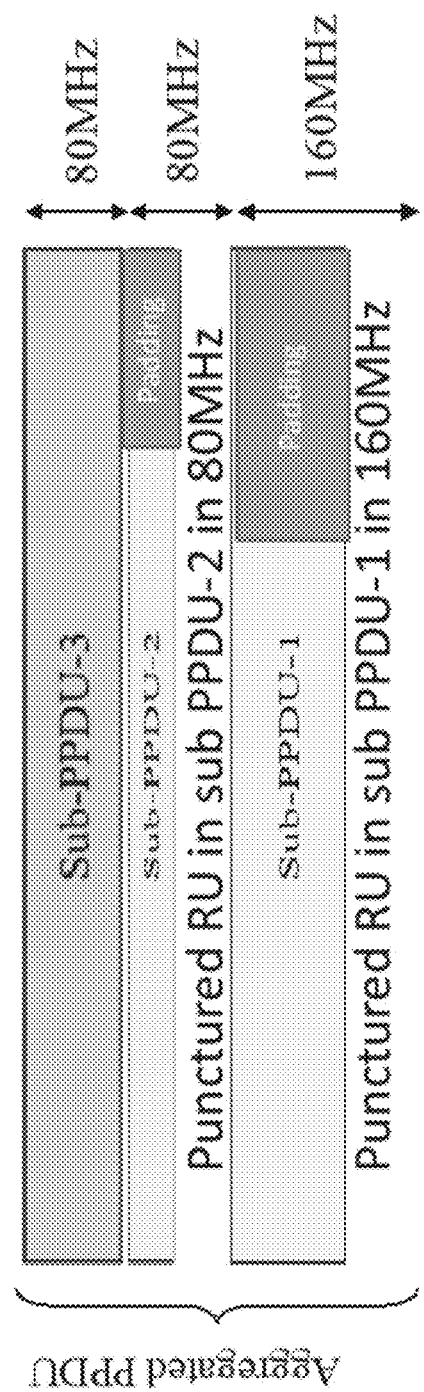
FIG. 18 is a diagram of one example embodiment of RU allocation (bandwidth allocation) of APPUD using the efficient padding with RU control method.

In other embodiments, the same approach can be applied to RUs with different tone numbers if defined additionally. For the other cases, the above example for padding with various RU sizes can be extended. After determining the appropriate RU size for the shorter sub-PPDUs, the process can apply the APPDU padding with the extended post-FEC padding or PE approaches to align the packet end. To realize this approach, an APPDU structure with multiple punctured RU allocation should be allowed as shown in FIG. 18. FIG. 18 is a diagram of one example embodiment of RU allocation (bandwidth allocation) of APPUD using the efficient padding with RU control method.

Figure 19:
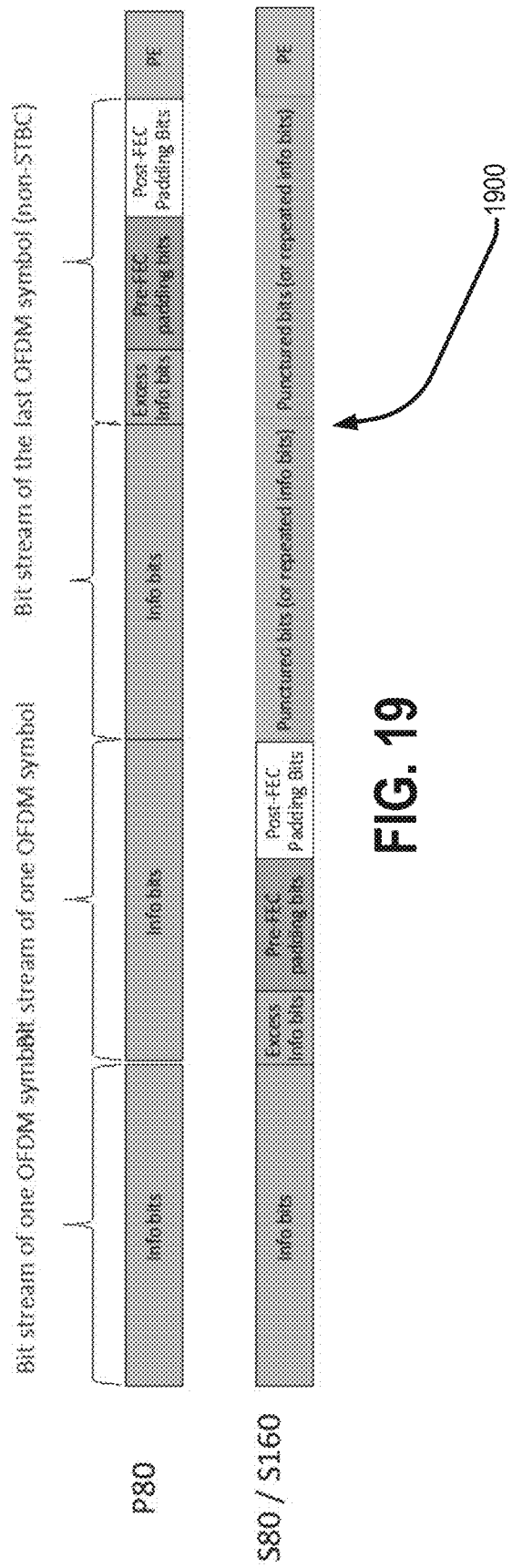
FIG. 19 is a diagram that shows that if the padding part is long enough to deliver the punctured bits, all punctured bits are delivered.

In the above described padding method, dummy information, which wastes time and frequency resource, is used for padding, which can be applied to more than one OFDM symbol (non-STBC case). To efficiently use such a padding part, the process can deliver useful information for decoding of the sub-PPDU in this padding part. If the coding rate is higher than 1/2, i.e., R=2/3, 3/4, or 5/6, there are punctured bits in the FEC encoding process. In the padding part, all or some of the punctured bits can be delivered with the same QAM mapping in the information part or the predefined specific QAM mapping. If the padding part is long enough to deliver the punctured bits, all punctured bits are delivered as shown in FIG. 19. If the padded OFDM symbols 1900 ('punctured bits') in FIG. 19 are not enough to send all the punctured bits, the process can regularly select the bits among the punctured bits. If there are no punctured bits in the encoding process, e.g., code rate is 1/2, all or some of the information bits are retransmitted in the padding part 1900.

Figure 20:
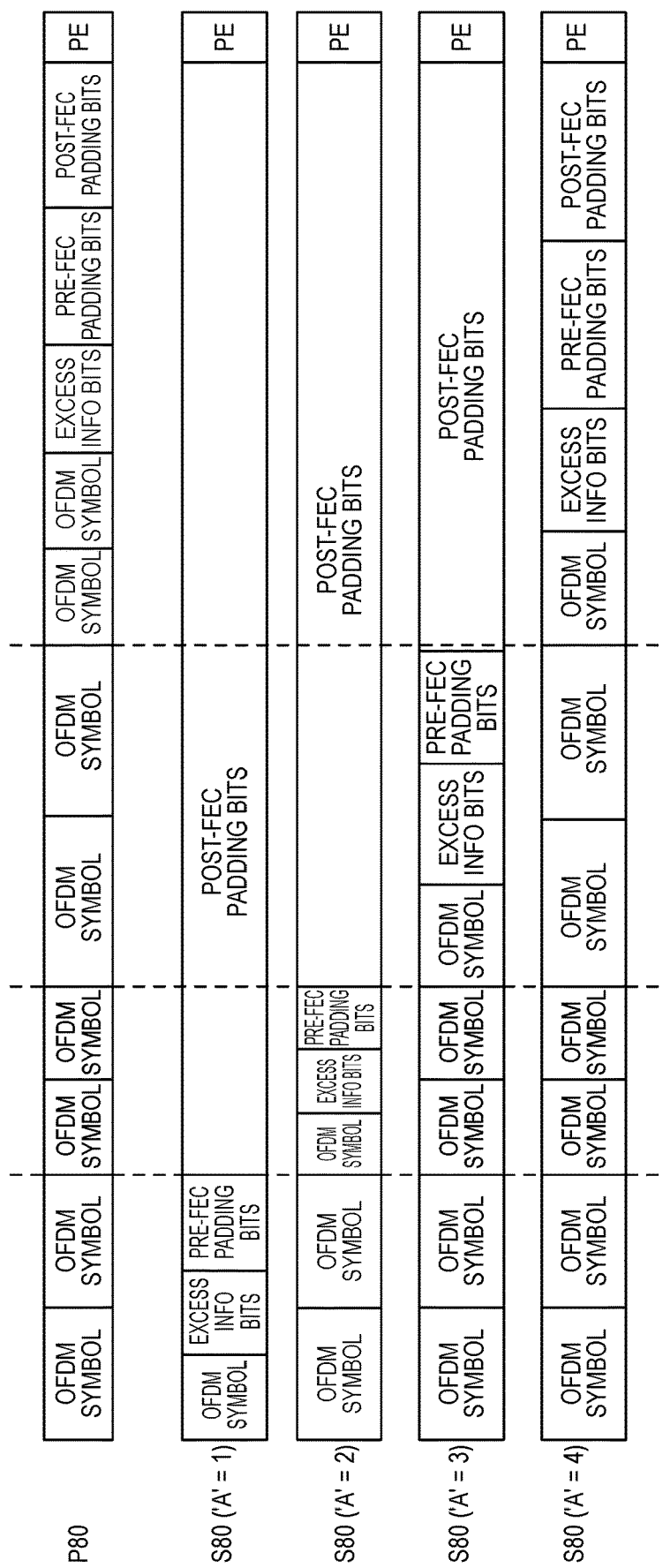
FIG. 20 is a diagram of one embodiment of a primary 80 MHz sub-PPDU that employs IEEE 802.11ax padding.
Figure 21:
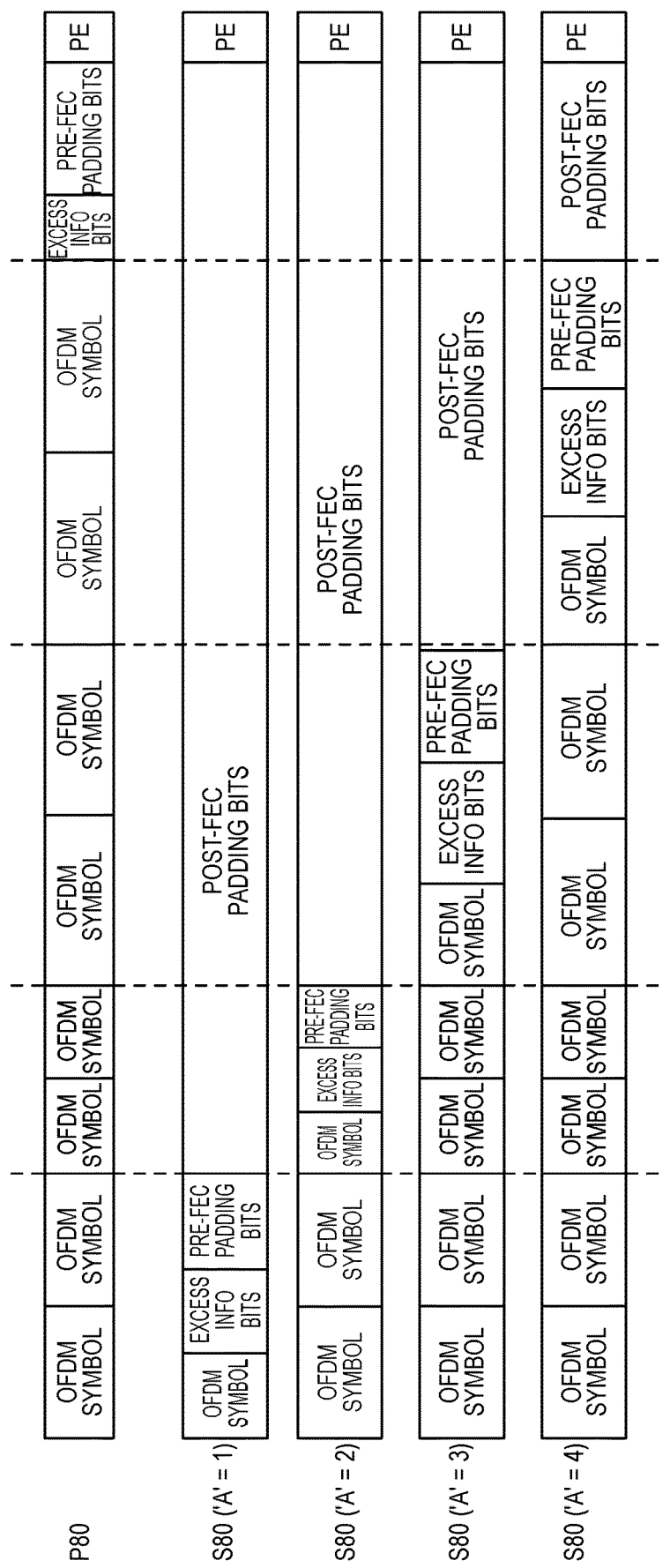
FIG. 21 is a diagram of one embodiment of all sub-PPDUs that employ a new padding method.

In the embodiments, to implement the aforementioned approaches, additional bits to indicate the length of multiple sub-PPDUs are needed. To avoid such additional indication bits, the process can use a parameter 'a', which is used to indicate the boundary of the last OFDM symbol in IEEE 802.11ax, and can be used in the embodiments to indicate the packet boundary of each sub-PPDU. If the number of OFDM symbols in the longest sub-PPDU is given by $N_{SYM,1}$, the packet boundary is determined by $N_{SYM,boundary}=\lceil N_{SYM,1}/4 \rceil$ or $N_{SYM,boundary}=\lceil N_{SYM,1}/4 \rceil$. Therefore, the process sets 'a' parameter depending on the number of OFDM symbols of the sub-PPDU, $N_{SYM,2}$, and the packet boundary, $N_{SYM,boundary}$ as shown in FIGS. 20 and 21.

If $N_{SYM,2} \leq N_{SYM,boundary}$, then 'a'=1 and the number of OFDM symbols for post-FEC padding is $N_{SYM,1}$ $N_{SYM,boundary}$.

Else if $N_{SYM,2} \leq N_{SYM,boundary} \times 2$, then, 'a'=2 and the number of OFDM symbols for post-FEC padding is $N_{SYM,1} - N_{SYM,boundary} \times 2$.

Else if $N_{SYM,2} \leq N_{SYM,boundary} \times 3$, then, 'a'=3 and the number of OFDM symbols for post-FEC padding is $N_{SYM,1} - N_{SYM,boundary} \times 3$.

Else (i.e., $N_{SYM,2} \leq N_{SYM,1}$), then, 'a'=4 and the number of OFDM symbols for post-FEC padding is $N_{SYM,1} - N_{SYM,2}$.

The embodiments can include the two cases shown in FIGS. 20 and 21. FIG. 20 is a diagram of one embodiment of a primary 80 MHz sub-PPDU that employs IEEE 802.11ax padding. FIG. 21 is a diagram of one embodiment of all sub-PPDUs that employ a new padding method. FIG. 20 is an example of APPDU padding using the parameter 'a' as a packet boundary $$\left(N_{SYM,boundary} = 2\left(=\left\lfloor\frac{9}{4}\right\rfloor\right)\right).$$

In these examples, the primary sub-channel is occupied by an IEEE 802.11ax device and it is the longest sub-PPDU of an APPDU. In this case, the sub-PPDU in the primary sub-channel employs the existing IEEE 802.11ax padding method. For the other sub-PPDUs, the 'a' parameter is used to indicate the boundary of the pre-FEC padding. And post-FEC padding is employed for the remaining number of OFDM symbols for sub-PPDUs. The PE is identical to that of the primary sub-PPUD. All sub-channels are occupied by IEEE 802.11be or post-IEEE 802.11be devices in these examples. In this case the primary sub-PPDU employs the new padding method in the first case. Therefore, there is no post-FEC padding in the longest sub-PPDU. The length of PE may be longer than that in IEEE 802.11ax padding to secure enough receiver processing time. Finally, no transmission in the padding part of each sub-PPDU can be considered because the padding is waist of communication resource. And then, the padding part can be used by other STAs in OBSSs.

Though the examples and embodiments illustrate the cases where the sub-PPDU in the primary subchannel is the longest sub-PPDU in the previous examples in Figures from 16 to 21, the sub-PPDU in the secondary subchannels can be longer than one in the primary channel. In this case, first, the Wi-Fi amendment in the primary channel may be IEEE 802.11be or post-IEEE 802.11be, enhancement of IEEE 802.11be because APPDU padding in IEEE 802.11ax cannot be defined. Second, the longest length could be separately indicated in sub-PPDUs on the secondary subchannel. It could help for STAs that do not have knowledge of which sub-PPDU is the longest. The sub-PPDUs on the secondary subchannels carry two length information fields to indicate a first length with longest length among all sub-channels and a second length with its own length. The first and second length fields could be carried on different 20 MHz assuming one sub-PPDU is equal to or more than 40 MHz PPDU. To keep backward compatibility, the sub-PPDU in the primary subchannel could be transmitted in HE MU PPDU and follows the packet extension rule to be applied to multiple users in 11ax as shown in Eq. (8) to Eq. (17). Then the length information indicates the longest length among the sub-PPDUs and if necessary, the more than one last OFDM symbols contain pre-FEC bits. It allows to interpret other STAs transmitting longer data information.

Figure 22:
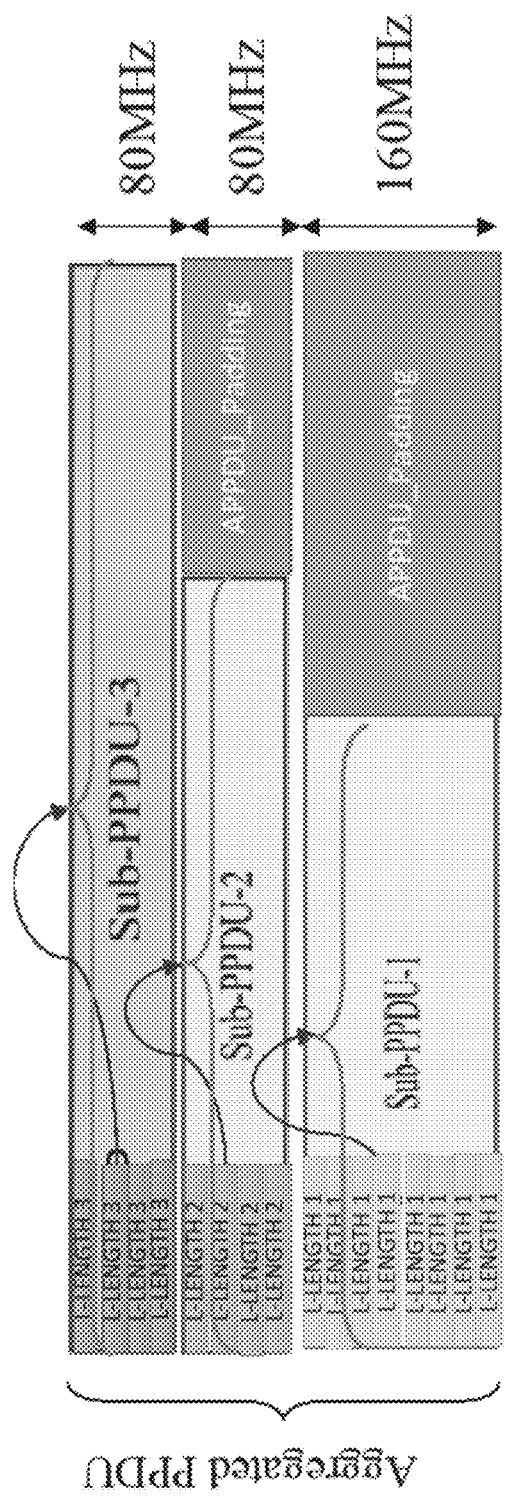
FIG. 22 is a diagram of one example for indication of the method of sub-PPUD length with 20 MHz-duplicate L-LENGTH.
Figure 23:
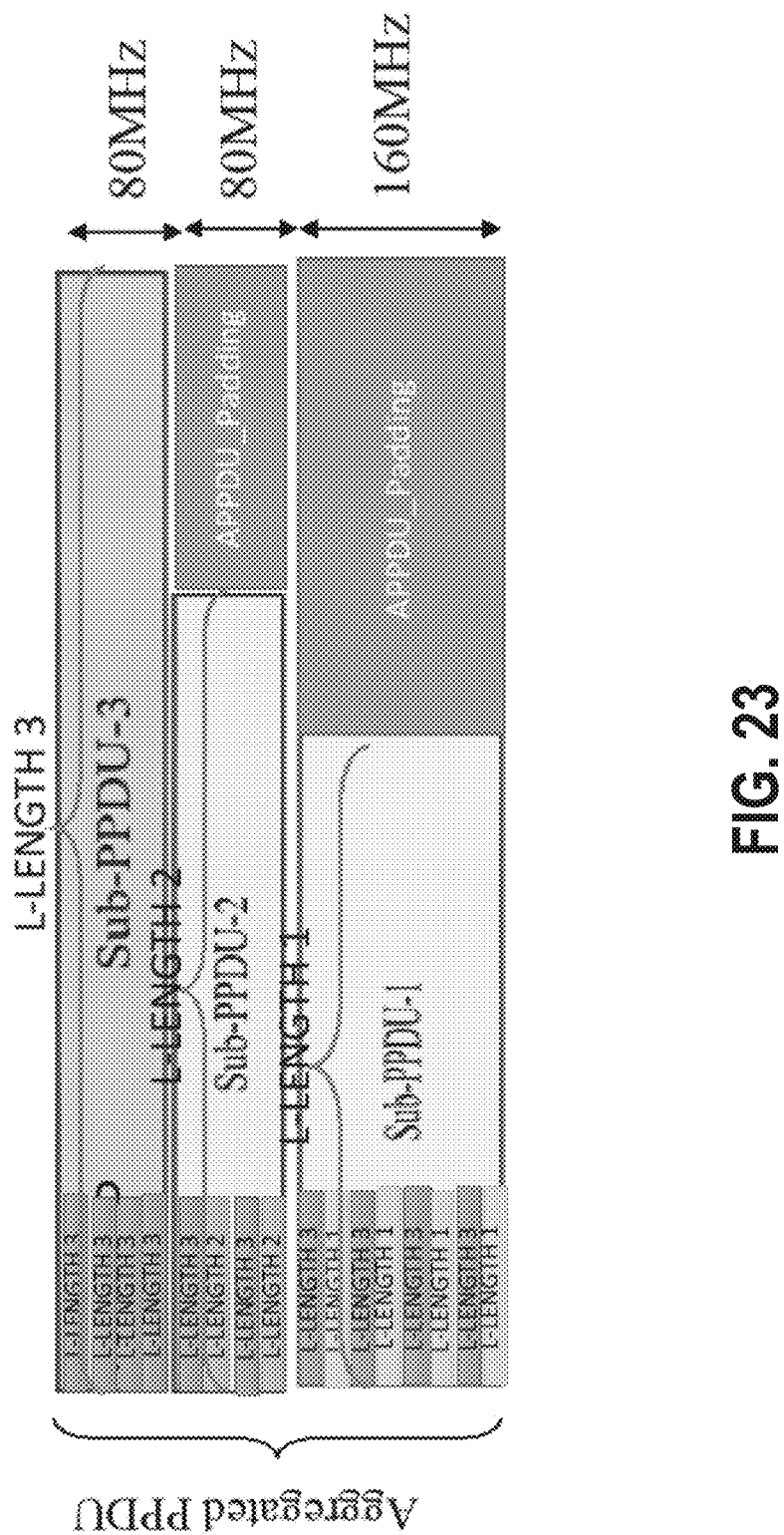
FIG. 23 is a diagram of one example of indication method of sub-PPDU length with 40 MHz-duplicate L-LENGTH where the longest sub-PPDU is in the primary subchannel.
Figure 24:
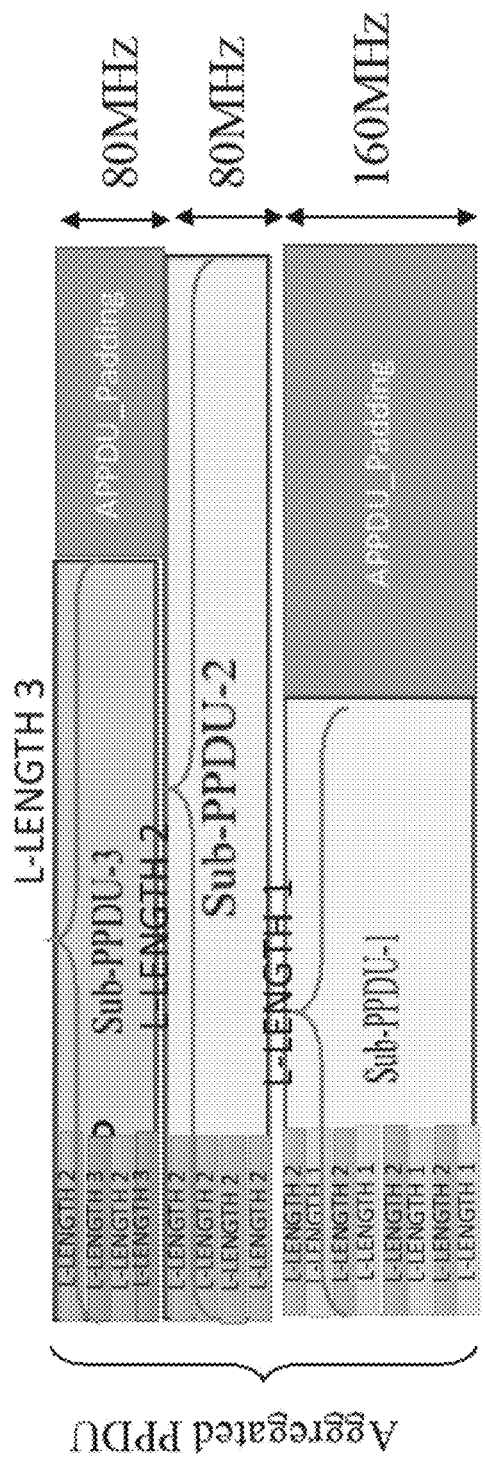
FIG. 24 is a diagram of one example of indication method of sub-PPDU length with 40 MHz-duplicate L-LENGTH where the longest sub-PPDU is in the secondary subchannel.

As described herein, the methods for APPDU padding that have been introduced can be implement by indicating the additional bits for the padding parts and methods. To this end, the embodiments can use L-LENGTH in the L-SIGNAL symbol in multiple sub-PPDUs. For L-LENGTH in the primary subchannel indicates the longest sub-PPDU length, i.e., the APPDU length. The L-LENGTHs in the multiple secondary subchannels indicate the length of the corresponding sub-PPDU as shown in FIG. 22. If the receivers operating in secondary subchannels are assumed to decode both legacy preamble parts in the primary subchannel and the corresponding secondary subchannel, the receivers can identify the portion of the APPDU-padding in the corresponding sub-PPDU. If the receivers cannot decode both L-LENGTHs in the primary and secondary subchannels, then the process can use a 40 MHz-duplicate L-LENGTH method as shown in FIGS. 23 and 24 as an alternative of the 20 MHz-duplicated L-LENGTH method in FIG. 22. Without changing the existing IEEE 802.11ax standard, however, the 40 MHz-duplicate L-LENGTH method can be used only then the sub-PPDUs except the longest sub-PPDU follow IEEE 802.11be or post-IEEE 802.11be standards. FIG. 22 is a diagram of one example for indication of the method of sub-PPUD length with 20 MHz-duplicate L-LENGTH.

FIG. 23 is a diagram of one example of indication method of sub-PPDU length with 40 MHz-duplicate L-LENGTH where the longest sub-PPDU is in the primary subchannel. FIG. 24 is a diagram of one example of indication method of sub-PPDU length with 40 MHz-duplicate L-LENGTH where the longest sub-PPDU is in the secondary subchannel.

Figure 25:
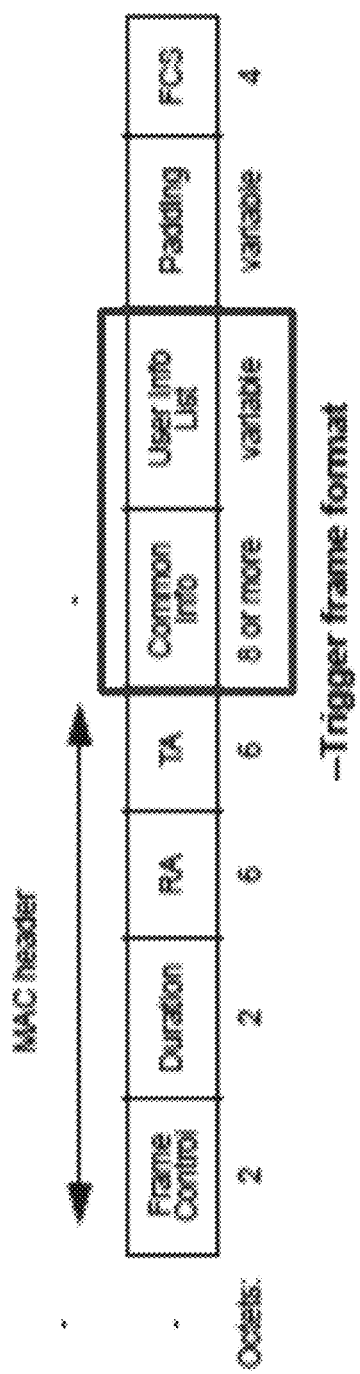
FIG. 25 is a diagram of a trigger frame format in IEEE 802.11ax.
Figure 26:
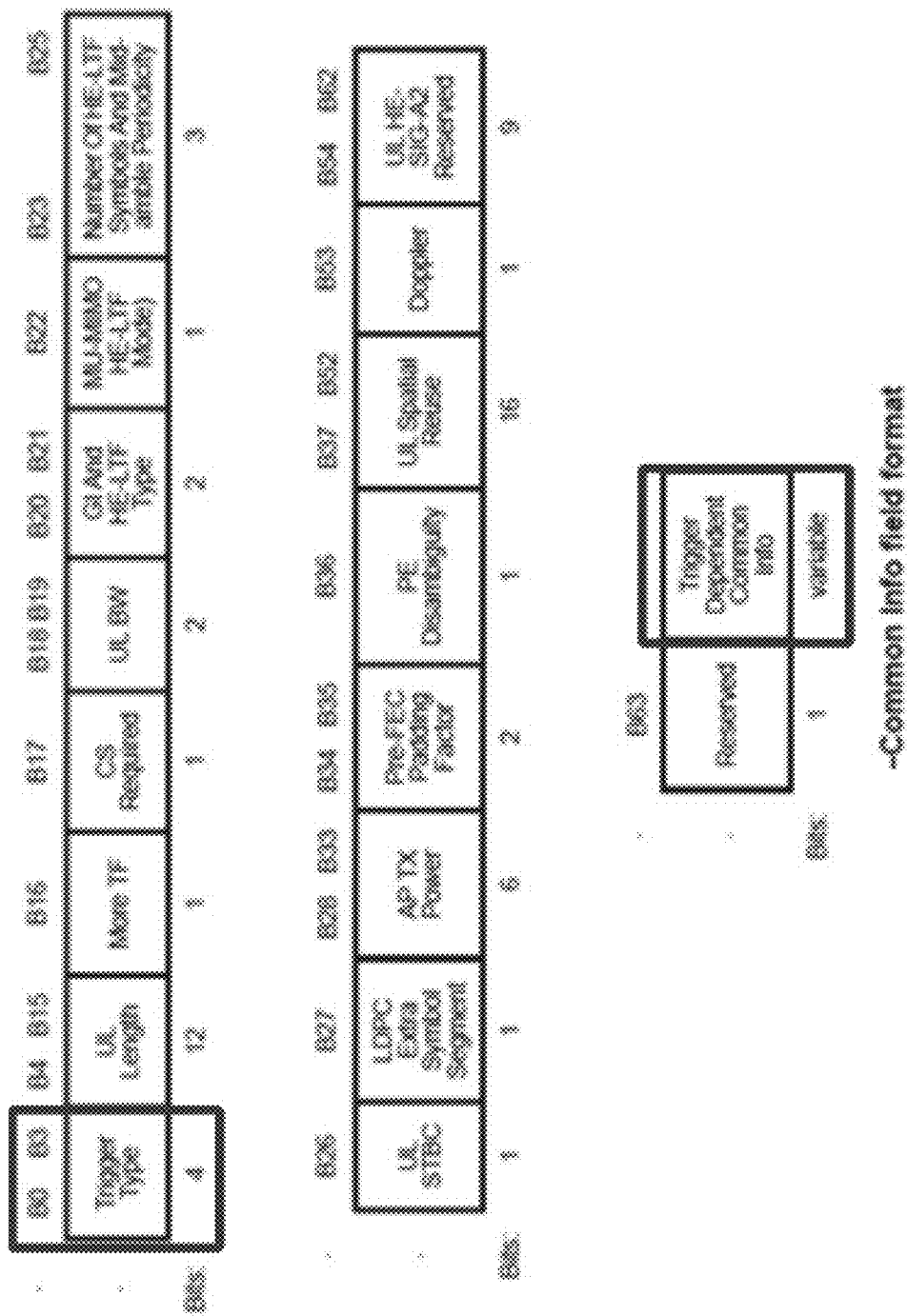
FIG. 26 is a diagram of a common info field format in trigger frame in IEEE 802.11ax.
Figure 27:
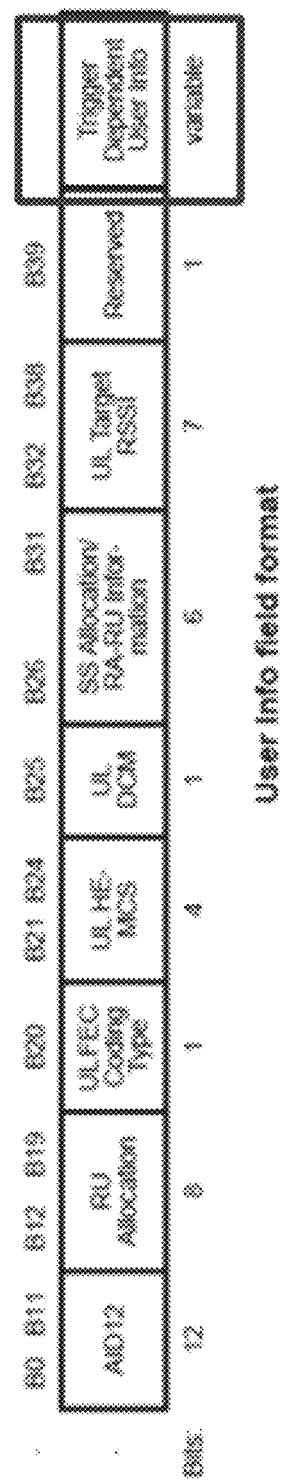
FIG. 27 is a diagram the user info field format in trigger frame in IEEE 802.11ax.

As alternative approach to indicate padding structure, the embodiments can use the trigger frame of an APPDU transmission. As shown in FIG. 9, the trigger frame is followed by APPDU transmission, the indication bits for APPDU padding can be included in the trigger frame. FIGS. 25-27 shows the trigger frame format in IEEE 802.11ax. To use the trigger frame to deliver the padding information, all sub-PPDUs follow IEEE 802.11be or post-IEEE 802.11be standards because IEEE 802.11ax devices cannot interpret the modified trigger frame, i.e., APPDU trigger frame. To make a new trigger frame, the embodiments can define a new trigger type which was not used in IEEE 802.11ax (was the reserved trigger type) and add the trigger dependent common info subfield in Common Info field or trigger dependent user info in User info field(list). Because the 'Trigger type subfield' encoding values from 8 to 15 are reserved in the 'common info' field, one of the reserved values, which is denoted by 'A' (for example, A=8) can be used to define another variant of trigger type subfield. APPDU could carry 11ax trigger frame in PSDU on the primary 80 MHz while APPDU trigger frame in PSDU is on the secondary subchannels. FIG. 25 is a diagram of a trigger frame format in IEEE 802.11ax. FIG. 26 is a diagram of a common info field format in trigger frame in IEEE 802.11ax. FIG. 27 is a diagram the user info field format in trigger frame in IEEE 802.11ax. The highlighting boxes in FIGS. 25-27 denote subfields to be modified for the APPDU trigger frame.

The contents to be added for APPDU trigger frame are as follows: the number of sub-PPDU: n (from 1 to 15); RU-allocation for each sub-PPDU: 8 bits*n; padding information for each sub-PPDU: m bits*n (where m depends on padding method); and padding type (if needed): k bits*n (where k depends on the number of padding types) (This sub-field is needed only when multiple padding methods (types) are defined.)

As an alternative to defining the new trigger type, the embodiments can use the existing trigger type and use the reserved AID values. As shown in the table of FIG. 28, 'AID12' subfields of 2008~2044 and 2047~4096 are reserved. Therefore, the embodiments can use these AID12s to deliver the APPDU padding information while using the existing trigger type. FIG. 28 is a diagram of one embodiment of a table of the AID12 subfield encoding in IEEE 802.11ax.

Figure 29:
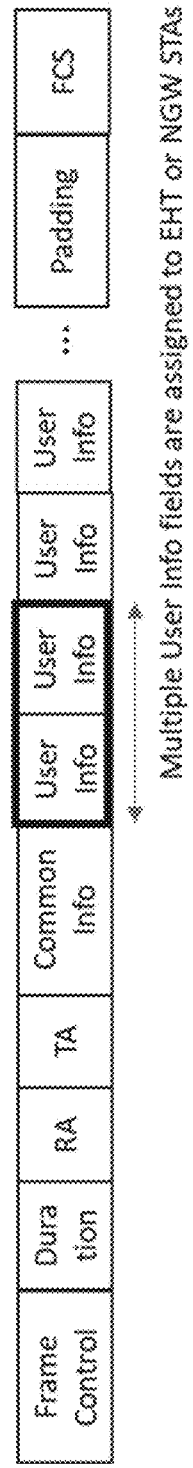
FIG. 29 is a diagram that shows the reuse of the existing trigger type except repurposing two or more multiple user info fields that assigned to each STA on the sub-PPDUs over secondary subchannel.

As an alternative to defining the new trigger type, the embodiments can reuse the existing trigger type except repurposing two or more multiple user info fields that assigned to each STA on the sub-PPDUs over secondary subchannel as shown in FIG. 29. The first AID in multiple User info could be used to indicate target STA. For the other information to be conveyed, the additional data contents mentioned above could be carrier though multiple user info fields.

In order to prevent HE STAs from attending the HE TB PPDU, there may be some restrictions. For example, the location of AID in the second (or third and after) User info field should not carry specific values indicating 2045 for unassociated STAs because some unassociated HE STAs try to response HE TB PPDUs. Or to make it simple, AID except for the first AID in User info could carry one of reserved bits defined in the table of FIG. 28.

Figure 30:
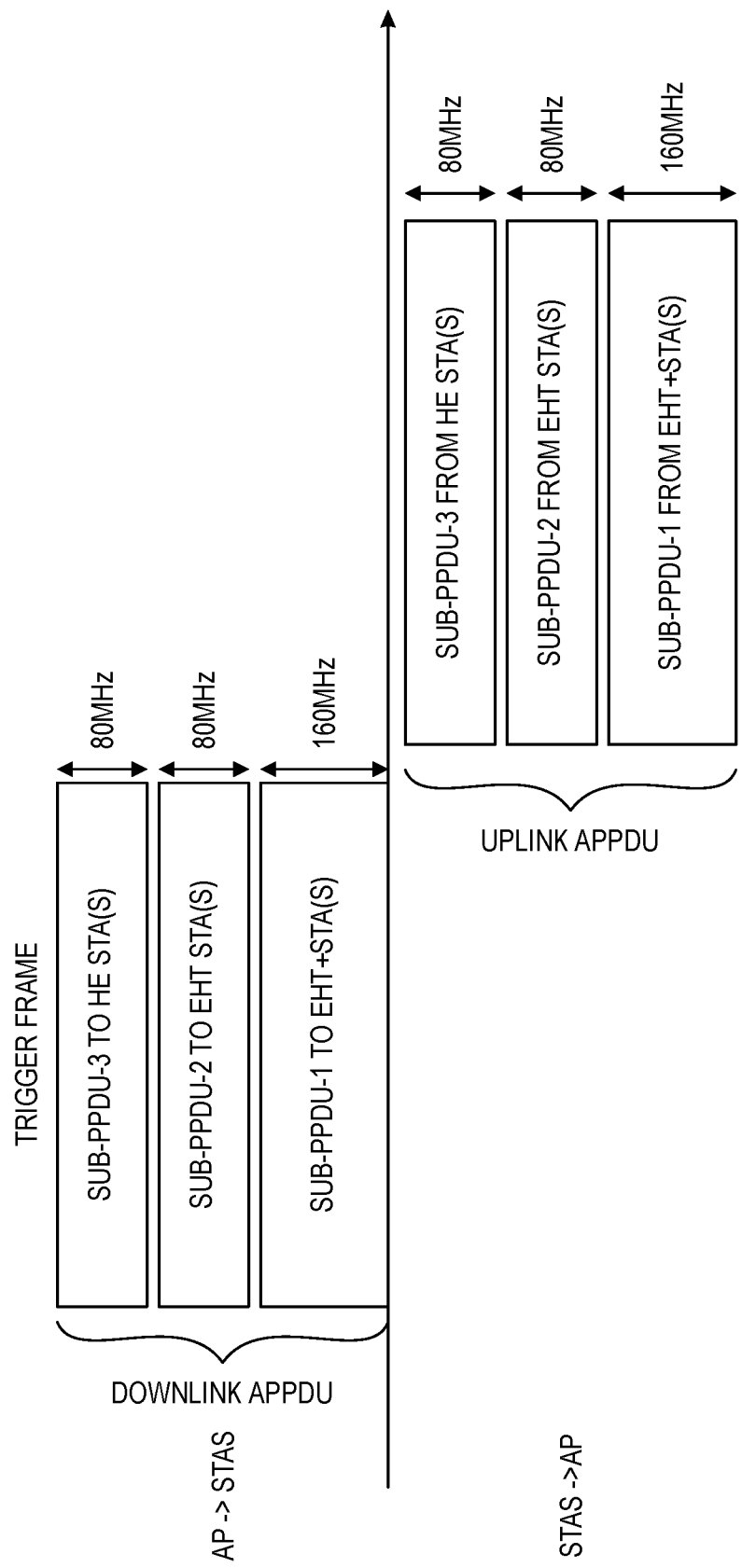
FIG. 30 is a diagram of one example of the APPDU trigger frame and APPDU transmission.

The Trigger frame, which initiates (triggers) the transmission of APPDU, can use the APPDU structure. A detailed example is shown in FIG. 30. FIG. 30 is a diagram of one example of the APPDU trigger frame and APPDU transmission.

Figure 31:
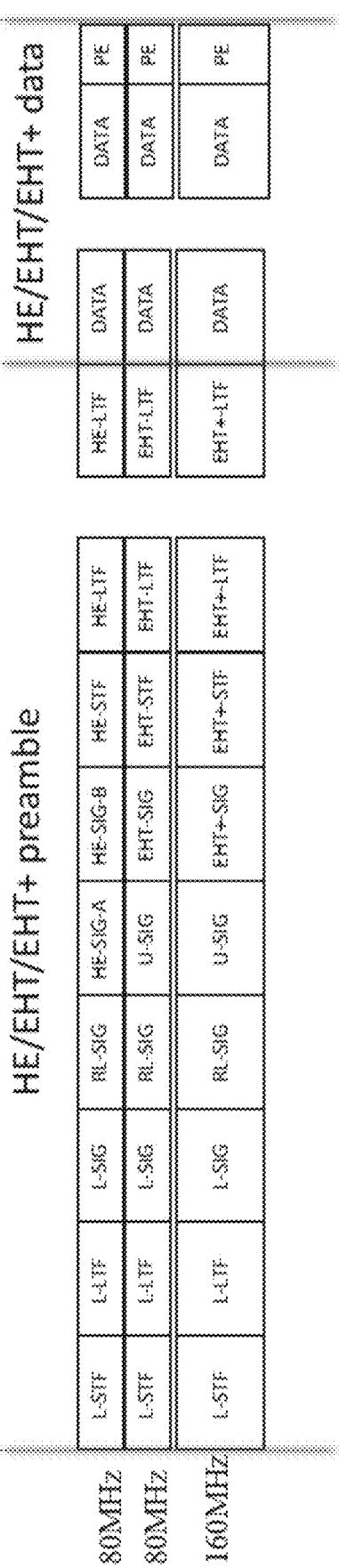
FIG. 31 is an example of the APPDU trigger frame with symbol-level packet alignment.

As shown in FIG. 30, an APPDU trigger frame is transmitted by an AP to trigger an APPDU uplink frame in the different frequency band with different standard versions, e.g., 802.11ax(HE), 11be(EHT) and beyond 11be(EHT+). In this case, the multiple sub-PPDUs in the APPDU trigger frame should be aligned in the symbol level. To this end, the preamble (STFs, LTFs and SIGNALs) and data (DATA and PE) parts are aligned as shown in FIG. 31. FIG. 31 is an example of the APPDU trigger frame with symbol-level packet alignment.

The HE format sub-PPDU should use MU-PPDU format to align the preamble part of EHT (and EHT+) sub-PPDU even though it is transmitted to a single user. For data part, the process makes the length of HE, EHT, and EHT+trigger frames be same in the trigger frame. To match the data part, the process considers the following several approaches. As the simplest approach, a padding sub-field in the trigger frame format can be used to match the length of all sub-PPDU. In an HE trigger frame format, there is a padding sub-field and then the process can use it. The Padding sub-field is optionally present in an HE Trigger frame. The original purpose of the padding sub-field is to extend the frame length to give the recipient STAs enough time to prepare a response for transmission a SIFS after the frame is received. The Padding field, if present, is at least two octets in length and is set to all "1"s. Therefore, one more purpose of the padding sub-field in HE trigger frame, which trigger APPDU uplink transmission, is added. To this end, EHT and EHT+ trigger frame format should include the padding sub-field. Alternatively, the embodiments can use the APPDU padding, which is proposed previously in this patent to match the APPDU length (not for an APPDU trigger frame but for general APPDU frame).

In the TRS (Trigger response scheduling) scheme in IEEE 802.11ax, a frame containing a TRS control subfield can be regarded as another type of trigger frame. Therefore, such a frame with the TRS control subfield, which triggers the APPDU transmission, can use the APPDU format with multiple sub-PPDUs. In this case, the embodiments also need to align the preamble and data parts of the APPDU as in FIG. 31. However, a frame containing a TRS control subfield can contain other data contents. Then, to match the data part of the APPDU frame, we can use the padding and packet extension method which proposed in this patent.

In the embodiments, several padding methods for an APPUD to align the ending time of multiple sub-PPDUs, which are simultaneously transmitted through different sub-channels, are proposed. By using the proposed method, the embodiments can improve the efficiency of the APPDU packet design by reducing the padding part or by utilizing the padding part to improve the packet decoding performance. Additionally, methods to indicate the different padding information for multiple sub-PPDUs are provided.

Figure 32:
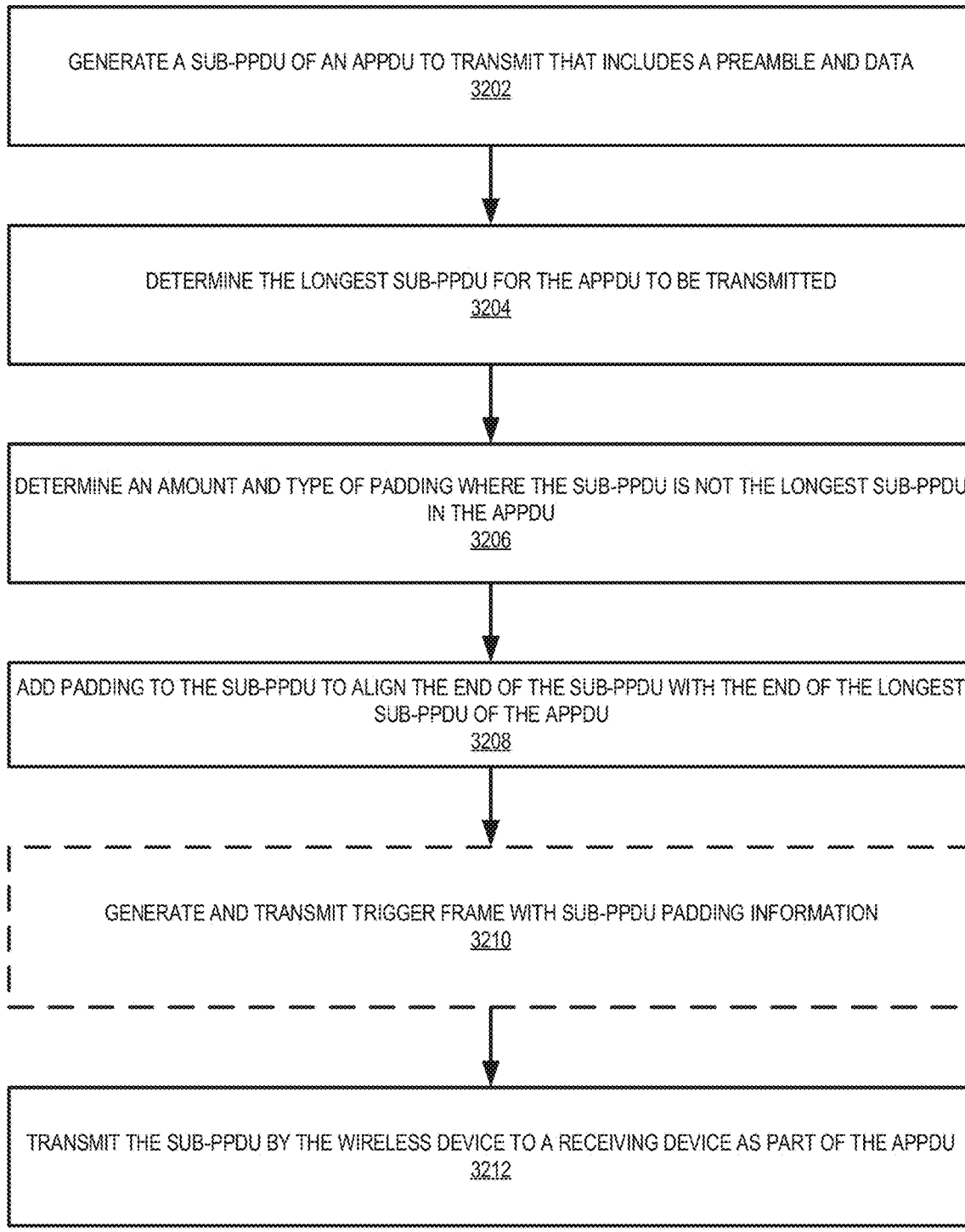
FIG. 32 is a diagram of a method for padding an APPDU when one of the sub-PPDU channels has a transmission that is more than an OFDM symbol longer than the other sub-PPDU channels.

Turning now to FIG. 32, a method will be described for padding an APPDU when one of the sub-PPDU channels has a transmission that is more than an OFDM symbol longer than the other sub-PPDU channels. The method may be performed by one or more devices described herein. For example, the method may be performed by a wireless device 104. Additionally, although shown in a particular order, in some embodiments the operations of the method may be performed in a different order. For example, although the operations of the method are shown in a sequential order, some of the operations may be performed in partially or entirely overlapping time periods.

As shown in FIG. 32, the method may commence at operation 3202 with a wireless device (e.g., a WLAN device 104) generating a sub-PPDU that is a part of an APPDU where the sub-PPDU includes a preamble portion and a data portion (e.g., DATA field) that incudes first data. The PPDU may have an HE PPDU format, HE SU PPDU format, or HE ER SU PPDU format, or similar format, as described herein above.

At operation 3204, the wireless device determines the longest sub-PPDU for the APPDU to be transmitted. Where the wireless device is the transmitter of each sub-PPDU this determination can be made by comparison. In cases where the other sub-PPDUs in the APPDU are transmitted by other wireless devices (e.g., other STAs), the determination can be based on information provided in trigger frames, or previously transmitted sub-PPDUs from the other wireless devices. At operation 3206, based on the determination of the longest sub-PPDU the wireless device can compare the length of the sub-PPDU to be transmitted to determine whether the end of the APPDU is more than an OFDM symbol in length and if so, how many addition OFDM symbols. Based on the determined length, a type of padding can be selected for the sub-PPDU. Where the padding is less than an OFDM symbol, then the padding can be consistent with the 802.11ax padding scheme. If the padding is greater than an OFDM symbol, then the different padding schemes as described in relation to FIGS. 15 and 16 can be utilized. In some embodiments, the RU size of the sub-PPDU can be adjusted to correlate with the longest sub-PPDU and dummy information utilized for padding as shown in relation to FIG. 18. At operation 3208, the selected padding is added to the sub-PPDU to align the end of the sub-PPDU with the end of the longest sub-PPDU of the APPDU.

In some embodiments, when a trigger frame is generated and sent the trigger frame includes information about the selected padding, at operation 3210. The information in the trigger frame can include various configurations as described herein in relation to FIGS. 25-29.

At operation 3212, the wireless device transmits the sub-PPDU through a wireless medium on a transmission channel. The wireless device may transmit the sub-PPDU using one or more of the padding schemes described herein.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method by a wireless device to align sub-physical layer (PHY) protocol data units (sub-PPDUs) in an aggregated PPDU (A-PPDU), the method comprising:
generating the sub-PPDUs, each including a preamble portion and a data portion, each sub-PPDU following a different Wi-Fi amendment, each sub-PPDU being transmitted in a separate channel and the total bandwidth comprising a primary channel and a secondary channel;
maintaining a consistent tone spacing across the sub-PPDUs;
determining an amount and type of padding for each sub-PPDU, where the sub-PPDUs are not a longest sub-PPDU in the A-PPDU, each sub-PPDU on the secondary channels including two length information fields indicating a first length designating a longest sub-PPDU among all channels and a second length designating each sub-PPDU's own length; and
transmitting the sub-PPDUs through a wireless medium on a transmission channel to a receiving device as part of the A-PPDU.

2. The method of claim 1, wherein the padding is a dummy padding extension (PE) or a combination of excess information bits, pre-forwarding error correction (FEC) padding bits, and post-FEC padding bits for each extra Orthogonal Frequency Division Multiplexing (OFDM) symbol in each sub-PPDU.

3. The method of claim 1, wherein the padding includes punctured bits in the FEC encoding process where the coding rate is higher than 1/2.

4. The method of claim 1, wherein $N_{SD}$ and $N_{SD}$, short defined dependent on a variable resource unit (RU) size with or without dual carrier modulation (DCM), where the RU, $N_{SD}$ and $N_{SD}$, short can be any one of RU 26, $N_{SD}$ is 24 and $N_{SD}$, short is 6 for DCM=0, and $N_{SD}$ is 12 and $N_{SD}$, short is 2 for DCM=1, for RU 52, $N_{SD}$ is 48 and $N_{SD}$, short is 12 for DCM-0, and $N_{SD}$ is 24 and $N_{SD}$, short is 6 for DCM=1, RU 78, $N_{SD}$ is 72 and $N_{SD}$, short is 18 for DCM=0, and $N_{SD}$ is 36 and $N_{SD}$, short is 8 for DCM=1, RU 106, $N_{SD}$ is 102 and $N_{SD}$, short is 24 for DCM=0, and $N_{SD}$ is 51 and $N_{SD}$, short is 12 for DCM=1, RU 132, $N_{SD}$ is 126 and $N_{SD}$, short is 30 for DCM=0, and $N_{SD}$ is 63 and $N_{SD}$, short is 14 for DCM=1, RU 242, $N_{SD}$ is 234 and $N_{SD}$, short is 60 for DCM=0, and $N_{SD}$ is 117 and $N_{SD}$, short is 30 for DCM=1, RU 484, $N_{SD}$ is 468 and $N_{SD}$, short is 120 for DCM-0, and $N_{SD}$ is 234 and $N_{SD}$, short is 60 for DCM=1, RU 726, $N_{SD}$ is 702 and $N_{SD}$, short is 180 for DCM=0, and $N_{SD}$ is 351 and $N_{SD}$, short is 90 for DCM=1, RU 996, $N_{SD}$ is 980 and $N_{SD}$, short is 240 for DCM=0, and $N_{SD}$ is 490 and $N_{SD}$, short is 120 for DCM=1, RU 996x2, $N_{SD}$ is 1960 and $N_{SD}$, short is 492 for DCM-0, and $N_{SD}$ is 980 and $N_{SD}$, short is 246 for DCM=1, RU 484+996, $N_{SD}$ is 1448 and $N_{SD}$, short is 360 for DCM=0, and $N_{SD}$ is 724 and $N_{SD}$, short is 180 for DCM=1, RU 484+996x2, $N_{SD}$ is 2428 and $N_{SD}$, short is 612 for DCM-0, and $N_{SD}$ is 1214 and $N_{SD}$, short is 306 for DCM=1, RU 484+996x3, $N_{SD}$ is 3408 and $N_{SD}$, short is 852 for DCM=0, and $N_{SD}$ is 1704 and $N_{SD}$, short is 426 for DCM=1, RU 996x3 $N_{SD}$ is 2940 and $N_{SD}$, short is 720 for DCM=0, and $N_{SD}$ is 1470 and $N_{SD}$, short is 360 for DCM=1, RU 996x4, $N_{SD}$ is 3920 and $N_{SD}$, short is 984 for DCM-0, and $N_{SD}$ is 1960 and $N_{SD}$, short is 492 for DCM=1, or RU 242+484_996, $N_{SD}$ is 1682 and $N_{SD}$, short is 420 for DCM=0, and $N_{SD}$ is 841 and $N_{SD}$, short is 210 for DCM=1.

5. The method of claim 1, wherein resource unit (RU) control is utilized to make the length of each sub-PPDU as similar as possible to the length of the longest sub-PPDU.

6. The method of claim 1, wherein an L-Length in an L-Signal symbol is utilized to indicate a sub-PPDU length.

7. The method of claim 1, further comprising:
generating and transmitting a trigger frame with the sub-PPDU padding information.

8. The method of claim 7, wherein the trigger frame indicates padding information for the A-PPDU in a common information field, a user information list field, or reserved AID values.

9. The method of claim 7, wherein the trigger frame includes a number of a corresponding sub-PPDU, resource unit (RU) allocation for the corresponding sub-PPDU, bits of padding, or a padding type.

10. The method of claim 7, wherein the trigger frame is transmitted to trigger an A-PPDU uplink frame in a different frequency band with different standard versions.

11. A wireless device to align sub-physical layer (PHY) protocol data units (sub-PPDUs) in an aggregated PPDU (A-PPDU), the wireless device comprising:
a radio frequency transceiver;
a memory device storing a set of instructions; and
a processor coupled to the memory device and the radio frequency transceiver, wherein the set of instructions when executed by the processor causes the wireless device to:
generate the sub-PPDUs that each include a preamble portion and a data portion, each sub-PPDU configured to follow a different Wi-Fi amendment, each sub-PPDU transmitted in a separate channel and a total bandwidth comprising a primary channel and a secondary channel;
maintain a consistent tone spacing across the sub-PPDUs;
determine an amount and type of padding for each sub-PPDU, where each sub-PPDU is not the longest sub-PPDU in the A-PPDU, each sub-PPDU on the secondary channels includes two length information fields that indicate a first length that designates a longest sub-PPDU among all channels and a second length that designates each sub-PPDU's own length; and
transmit the sub-PPDUs through a wireless medium on a transmission channel to a receiving device as part of the A-PPDU.

12. The wireless device of claim 11, wherein the padding is a dummy padding extension (PE) or a combination of excess information bits, pre-forwarding error correction (FEC) padding bits, and post-FEC padding bits for each extra Orthogonal Frequency Division Multiplexing (OFDM) symbol in each sub-PPDU.

13. The wireless device of claim 11, wherein the padding includes punctured bits in the FEC encoding process where the coding rate is higher than 1/2.

14. The wireless device of claim 11, wherein $N_{SD}$ and $N_{SD}$, short defined dependent on a variable resource unit (RU) size with or without dual carrier modulation (DCM), where the RU, $N_{SD}$ and $N_{SD}$, short can be any one of RU 26, $N_{SD}$ is 24 and $N_{SD}$, short is 6 for DCM=0, and $N_{SD}$ is 12 and $N_{SD}$, short is 2 for DCM=1, for RU 52, $N_{SD}$ is 48 and $N_{SD}$, short is 12 for DCM=0, and $N_{SD}$ is 24 and $N_{SD}$, short is 6 for DCM=1, RU 78, $N_{SD}$ is 72 and $N_{SD}$, short is 18 for DCM-0, and $N_{SD}$ is 36 and $N_{SD}$, short is 8 for DCM=1, RU 106, $N_{SD}$ is 102 and $N_{SD}$, short is 24 for DCM=0, and $N_{SD}$ is 51 and $N_{SD}$, short is 12 for DCM=1, RU 132, $N_{SD}$ is 126 and $N_{SD}$, short is 30 for DCM=0, and $N_{SD}$ is 63 and $N_{SD}$, short is 14 for DCM=1, RU 242, $N_{SD}$ is 234 and $N_{SD}$, short is 60 for DCM=0, and $N_{SD}$ is 117 and $N_{SD}$, short is 30 for DCM=1, RU 484, $N_{SD}$ is 468 and $N_{SD}$, short is 120 for DCM=0, and $N_{SD}$ is 234 and $N_{SD}$, short is 60 for DCM=1, RU 726, $N_{SD}$ is 702 and $N_{SD}$, short is 180 for DCM=0, and $N_{SD}$ is 351 and $N_{SD}$, short is 90 for DCM=1, RU 996, $N_{SD}$ is 980 and $N_{SD}$, short is 240 for DCM=0, and $N_{SD}$ is 490 and $N_{SD}$, short is 120 for DCM=1, RU 996x2, $N_{SD}$ is 1960 and $N_{SD}$, short is 492 for DCM-0, and $N_{SD}$ is 980 and $N_{SD}$, short is 246 for DCM=1, RU 484+996, $N_{SD}$ is 1448 and $N_{SD}$, short is 360 for DCM=0, and $N_{SD}$ is 724 and $N_{SD}$, short is 180 for DCM=1, RU 484+996x2, $N_{SD}$ is 2428 and $N_{SD}$, short is 612 for DCM-0, and $N_{SD}$ is 1214 and $N_{SD}$, short is 306 for DCM=1, RU 484+996x3, $N_{SD}$ is 3408 and $N_{SD}$, short is 852 for DCM=0, and $N_{SD}$ is 1704 and $N_{SD}$, short is 426 for DCM=1, RU 996x3 $N_{SD}$ is 2940 and $N_{SD}$, short is 720 for DCM-0, and $N_{SD}$ is 1470 and $N_{SD}$, short is 360 for DCM=1, RU 996x4, $N_{SD}$ is 3920 and $N_{SD}$, short is 984 for DCM=0, and $N_{SD}$ is 1960 and $N_{SD}$, short is 492 for DCM=1, or RU 242+484_996, $N_{SD}$ is 1682 and $N_{SD}$, short is 420 for DCM=0, and $N_{SD}$ is 841 and $N_{SD}$, short is 210 for DCM=1.

15. The wireless device of claim 11, wherein resource unit (RU) control is utilized to make the length of each sub-PPDU as similar as possible to the length of the longest sub-PPDU.

16. The wireless device of claim 11, wherein an L-Length in an L-Signal symbol can be utilized to indicate a sub-PPDU length.

17. The wireless device of claim 11, further comprising:
generating and transmitting a trigger frame with the sub-PPDU padding information.

18. The wireless device of claim 17, wherein the trigger frame indicates padding information for the A-PPDU in a common information field, a user information list field, or reserved AID values.

19. The wireless device of claim 17, wherein the trigger frame includes a number of a corresponding sub-PPDU, resource unit (RU) allocation for the corresponding sub-PPDU, bits of padding, or a padding type.

20. The wireless device of claim 17, wherein the trigger frame is transmitted to trigger an A-PPDU uplink frame in a different frequency band with different standard versions.

* * * * *